United States Patent
Gaus et al.

(10) Patent No.: US 12,446,753 B2
(45) Date of Patent: Oct. 21, 2025

(54) HANDLING MODULE FOR LOADING A TRANSPORT DEVICE OF A CONVEYOR DISHWASHER

(71) Applicant: MEIKO Maschinenbau Gmbh & Co. KG, Offenburg (DE)

(72) Inventors: Bruno Gaus, Offenburg (DE); Harald Föhrenbach, Hohberg (DE); Bernd Ringwald, Ortenberg (DE); Denis Lehmann, Ortenberg (DE); Thomas Näger, Offenburg (DE); Markus Rohde, Rheinau (DE); Marcel Tränkle, Kappel-Grafenhausen (DE)

(73) Assignee: Meiko Maschinenbau Gmbh & Co. KG, Offenburg (DE)

( * ) Notice: Subject to any disclaimer, the term of this patent is extended or adjusted under 35 U.S.C. 154(b) by 355 days.

(21) Appl. No.: 17/909,023

(22) PCT Filed: Mar. 2, 2021

(86) PCT No.: PCT/EP2021/055209
§ 371 (c)(1),
(2) Date: Sep. 2, 2022

(87) PCT Pub. No.: WO2021/175866
PCT Pub. Date: Sep. 10, 2021

(65) Prior Publication Data
US 2023/0089808 A1 Mar. 23, 2023

(30) Foreign Application Priority Data
Mar. 2, 2020 (DE) .................. 102020202638.6

(51) Int. Cl.
A47L 15/00 (2006.01)
A47L 15/24 (2006.01)
(Continued)

(52) U.S. Cl.
CPC .......... *A47L 15/245* (2013.01); *A47L 15/248* (2013.01); *A47L 15/4227* (2013.01);
(Continued)

(58) Field of Classification Search
None
See application file for complete search history.

(56) References Cited

U.S. PATENT DOCUMENTS

| 3,520,726 A | 7/1970 | Gay et al. | |
|---|---|---|---|
| 3,938,533 A * | 2/1976 | Richard | B07C 99/00 209/907 |

(Continued)

FOREIGN PATENT DOCUMENTS

| DE | 1956049 A | 5/1971 |
|---|---|---|
| DE | 1956050 A | 5/1971 |

(Continued)

OTHER PUBLICATIONS

Translation of EP0159542 by Ritzenhoff, published Oct. 30, 1985.*
(Continued)

*Primary Examiner* — Kaj K Olsen
*Assistant Examiner* — Ryan L Coleman
(74) *Attorney, Agent, or Firm* — Taft Stettinius & Hollister LLP

(57) ABSTRACT

The invention relates to a handling module for loading a transport device of a conveyor dishwasher. The handling module comprises a turning wheel for turning a dishware item, a supply ramp and a feed ramp for transferring the dishware item from the turning wheel to a transport device of the conveyor dishwasher, wherein the feed ramp has at least one waste disposal opening, wherein the turning wheel is designed to receive the dishware item supplied via the supply ramp in an orientation with a use side facing upwards, wherein the turning wheel is also designed to turn (Continued)

the dishware item and to place same on the feed ramp with the use side facing downwards, wherein, when placing the dishware item on the use side, waste on the dishware item can be disposed of via the waste disposal opening due to gravity. The invention also relates to a cleaning system comprising the handling module, as well as a method for cleaning items to be cleaned.

21 Claims, 15 Drawing Sheets

(51) Int. Cl.
    *A47L 15/42*     (2006.01)
    *B08B 1/16*     (2024.01)
    *B08B 1/20*     (2024.01)
    *B65G 47/14*     (2006.01)
    *B65G 47/82*     (2006.01)

(52) U.S. Cl.
CPC ............... *B08B 1/165* (2024.01); *B08B 1/20* (2024.01); *B65G 47/1492* (2013.01); *B65G 47/82* (2013.01); *B65G 2201/022* (2013.01)

(56) References Cited

U.S. PATENT DOCUMENTS

| | | | |
|---|---|---|---|
| 3,944,093 A | | 3/1976 | Bergeron |
| 2006/0207862 A1* | | 9/2006 | Costanzo ............... B65G 17/32 198/698 |
| 2009/0183753 A1 | | 7/2009 | Maennle et al. |
| 2010/0132735 A1 | | 6/2010 | Gaus et al. |
| 2019/0127152 A1* | | 5/2019 | Wu ....................... A47L 15/248 |
| 2019/0167065 A1 | | 6/2019 | Yoon et al. |
| 2019/0167068 A1 | | 6/2019 | Yoon et al. |
| 2019/0315572 A1 | | 10/2019 | Kim et al. |

FOREIGN PATENT DOCUMENTS

| | | | |
|---|---|---|---|
| DE | 2214196 A | | 10/1972 |
| DE | 2443651 A1 | | 4/1976 |
| DE | 3413480 A1 | | 10/1985 |
| DE | 102004056052 A1 | | 6/2006 |
| DE | 102007025263 A1 | | 10/2007 |
| EP | 0159542 | * | 10/1985 |
| JP | H08182972 | * | 7/1996 |
| JP | 2004188319 | * | 7/2004 |
| KR | 20110010991 A | | 2/2011 |
| KR | 101327580 B1 | | 11/2013 |
| KR | 102030524 B1 | | 10/2019 |
| WO | WO0105293 | * | 1/2001 |
| WO | WO2008138160 | * | 11/2008 |
| WO | 2018031489 A1 | | 2/2018 |

OTHER PUBLICATIONS

Translation of JPH08182972 by Mitsui, published Jul. 16, 1996.*
Translation of WO2008138160 by Elkuch, published Nov. 20, 2008.*
Translation of JP2004188319 by Nakagawa, published Jul. 8, 2004.*
Merriam-Webster Dictionary definition of "finger".*
Written Opinion of the International Searching Authority; European Patent Office; International Application No. PCT/EP2021/055209; Jun. 7, 2021; 12 pages.
International Preliminary Report on Patentability; The International Bureau of WIPO; International Application No. PCT/EP2021/055209; Sep. 15, 2022; 8 pages.
International Search Report; European Patent Office; International Application No. PCT/EP2021/055209; Jun. 7, 2021; 6 pages.

* cited by examiner

HANDLING MODULE FOR LOADING A TRANSPORT DEVICE OF A CONVEYOR DISHWASHER

CROSS-REFERENCE TO RELATED APPLICATIONS

This application is a U.S. National Stage Application of International PCT Application No. PCT/EP2021/055209, which was filed on Mar. 2, 2021, and which claims priority to German Patent Application No. 102020202638.6, which was filed on Mar. 2, 2020. The contents of each of those applications are incorporated herein by reference in their entireties.

TECHNICAL FIELD

The invention relates to a handling module for loading a conveying apparatus of a conveyor dishwasher, and to a cleaning system for cleaning washware, comprising the handling module, and to at least one conveyor dishwasher. Furthermore, the invention relates to a method for cleaning washware using the cleaning system. By way of example, systems and methods of the aforementioned type can be used in the field of dishwasher technology, especially in the field of commercial dishwasher technology. Thus, the invention can be used in large-scale kitchens, in particular, where washware, for example trays, tableware and flatware, has to be cleaned in relatively large quantities. In particular, the invention can be used in conveyor dishwashers, for example belt conveyor dishwashers. However, other fields of use are also conceivable as a matter of principle.

TECHNICAL BACKGROUND

The prior art has disclosed a multiplicity of cleaning apparatuses, which are also referred to as cleaning appliances and which are able to clean and/or disinfect washware. Without restricting further possible configurations, the invention is described below with reference to washware which serves to present, prepare or store food. The configuration of these cleaning apparatuses depends significantly overall on the various boundary conditions, for example the type of washware to be cleaned, the contamination, the throughput or similar conditions. By way of example, reference can be made to cleaning apparatuses which are described in DE 10 2004 056 052 A1 or DE 10 2007 025 263 A1, for example.

By way of example, the washware may comprise a tray which is loaded with tableware, flatware, food remains and a napkin, for example. In this case, the tableware for example may comprise a plate, a soup bowl, a dessert bowl, a salad bowl, a cup and a drinking glass, or may comprise only a selection of these options. Additionally, warming vessels and an associated cover for the plate, for example, may be present, especially in hospitals or care establishments. These warming vessels are also referred to as cloches. Together with a tray, these items are also referred to as a place-setting set. The occurrence and the distribution of these parts can be very uniform, for example in a prison canteen. However, very variable compositions of the place-setting sets can occur, for example if there is a broad choice of food in canteens or university refectories. There may also be variability over time, for example in the difference between breakfast, lunch and dinner.

The flatware can usually comprise a knife, a fork, a soup spoon and a small spoon, or merely a selection of the aforementioned flatware items. Depending on country-specific conditions, it may be the case that variations in the place-setting set and also in the food remains are present or to be expected. The composition of the food remains can also be very different, for example from small remains of gravy on the plate to remains of the actual meal in all vessels up to virtually fully filled vessels. Additionally, there are also for example food remains that usually cannot be eaten, especially bones, fish bones, shellfish shells, stones, wooden skewers or similar objects.

In conventional large-scale kitchens, the washware is processed in various stages. The use of a conveyor dishwasher is described below in exemplary fashion. Thus, the loaded trays can initially be conveyed from the dining room into the dishwasher, for example by means of trolleys or else by means of conveyor systems such as conveyor belts. The trays can subsequently be separated, for example by hand or else by machine. Subsequently, disruptive parts can be removed and drinking glasses can be cleared. By way of example, drinking glasses can be emptied and inserted into special drinkware baskets or directly onto a conveyor belt of the dishwasher. Furthermore, the tableware items can be oriented appropriately so that they can be optimally held by the conveyor belt of the dishwasher and can be cleaned correctly. However, before that tableware is put into the dishwasher, food remains must, as a rule, be removed therefrom and be disposed of in such a way that the work surroundings are not contaminated. As a rule, flatware items are aligned and positioned in flatware baskets or flatware receptacles or else directly on the conveyor belt of the dishwasher. Furthermore, food remains and napkins must, as a rule, be cleared from the tray and be disposed of, in such a way that the work surroundings are not contaminated. Subsequently, the trays are as a rule inserted into the dishwasher, said trays being aligned individually in relation to the conveyor belt of the dishwasher so that they can be optimally received by the dishwasher and can be cleaned correctly.

There are multiple options for cleaning the place-setting set. For example, all parts could be processed in a single dishwasher. In this case, the conveying apparatus of the dishwasher, for example, can be divided into multiple lanes which are each designed on an individual basis for one type of washware. By way of example, it is possible to provide a lane for drinkware, a lane for trays, and one or more further lanes for different types of tableware. The arrangement and configuration of the lanes can be matched to the commercial requirements. Such dishwashers with multiple lanes are frequently also referred to as multi-lane dishwashers. As an alternative to the use of a single dishwasher, it is also possible to use separate dishwashers. By way of example, it is possible to provide a dishwasher for drinkware, which is collected in baskets, for example, and/or a separate tray dishwasher for trays. By way of example, the tray dishwasher can be arranged back-to-back to the dishwasher for tableware.

Individual ones or multiple ones of the aforementioned process steps can also be carried out automatically as an alternative to a manual implementation. Thus, for example, DE 1 956 050 A describes a pre-clearing device for equipping dishwashers with food plates and food trays, to be cleaned, from large-scale commercial kitchens. US 2019/0127152 A1 describes a conveying and loading apparatus. Furthermore, fully automated installations which are able to carry out the aforementioned steps and/or parts of the aforementioned steps are also known. By way of example, reference should be made to DE 1 956 049 A, DE 2 443 651

A1 or DE 3 413 480 A1 in this respect. Moreover, apparatuses with robots are also known. In this respect, reference can be made to the US 2019/0167065 A1, US 2019/0167068 A1 or WO 2018/031489 A1. By way of example, use can be made of magnetic flatware or else magnetic tableware, which is magnetically separated from the remaining tableware.

US 2019/0 3155 72 A1 discloses an appliance for flipping trays and tableware, which makes it possible to flip and sort trays and tableware, including dishes and bowls, without the tableware being damaged as a result of collisions. The flipping apparatus also reduces the labor needed for dishwashing by automatically flipping the trays and tableware. Also disclosed is a dishwashing system comprising a first conveyor transportation unit, the tray and tableware flipping apparatus, a flipping apparatus drive unit, a tray-transporting conveyor belt, a tableware-transporting conveyor belt, and a monitoring or detection sensor.

DE 22 14 196 A discloses a method for treating dirty tableware items prior to the washing operation and an apparatus for carrying out the method. The method for treating dirty tableware items prior to the washing operation is characterized in that the tableware items are conveyed on trays, which are provided with at least one opening below the location intended for at least certain items, and in that then the corresponding tableware items are removed by guiding movable members from underneath each tray through the openings in such a way that the aforementioned tableware items are raised and taken off in order to conduct them to a washing installation via a guide or a conveyor that carries them along.

Despite the advantages obtained by the apparatuses described above, there are still numerous technical and organizational challenges. In particular, planning staff requirements and adapting machines, automation and members of staff to the actual situation still represents a technical, organizational and economic problem. In particular, over-dimensioning or under-dimensioning of the apparatuses must be avoided while the staff requirement must be planned correctly and sufficiently for any situation at the same time.

Thus, numerous manual interventions are often required in conventional apparatuses for processing the individual process steps. This may lead to the performance of the human staff determining the limits of the processing capacity of the overall washing installation. Then, as a rule, one or more staff members must be employed in front of the dishwasher depending on the amount of washware per unit time. This use of staff requires space and costs money. Furthermore, a lack of staff may play an important role in this context. Moreover, the work conditions for the dishwasher staff are often burdensome since increased temperatures and usually also increased humidity may occur. Noise, smells, monotony and drafts may also contribute to the burden. On the other hand, the dishwasher and the coupled conveying systems generally specify a cycle that has to be observed by the staff in order to ensure a process sequence that is free of disruptions. Otherwise, the cleaning process can come to a standstill, which can for example have the result that no further trays can be dropped off.

Partially automatic solutions can reduce the running costs since individual process steps can be carried out by automatic apparatuses, thus allowing staff to be economized. Fully automatic solutions can also reduce costs. However, in practice, the known partially automatic or fully automatic installations are extremely complex in many cases on account of the multiplicity of tasks that have to be carried out by these installations. Then again, however, these installations are inflexible as a rule since they often have to be matched specifically to the place-setting set available. If there are changes in the place-setting set, the automatic or partially automatic installation must generally be retrofitted or upgraded. From a technical and economic point of view, often there is only a small scope for such changes in existing installations. Thus, as a rule, planning and implementation only offers the choice between the use of staff, who could be employed flexibly but nevertheless cause significant costs and make high demands in respect of the space required and ergonomics, and the use of partially automatic or fully automatic solutions, which, however, are inflexible.

OBJECT OF THE INVENTION

It would therefore be desirable to provide apparatuses and methods for cleaning washware, which at least largely avoid the above-described disadvantages of known apparatuses and methods of the specified type. In particular, the apparatuses and methods should firstly ensure a high throughput when cleaning washware and secondly have great cost efficiency and great flexibility in view of changing cleaning situations.

GENERAL DESCRIPTION OF THE INVENTION

This object is addressed by a handling module for loading a conveying apparatus of a conveyor dishwasher, by a cleaning system, and by a method for cleaning washware, having the features of the independent patent claims. Advantageous developments, which can be implemented individually or in any desired combination, are given in the dependent claims.

In the following text, the terms "exhibit", "have", "comprise" or "include" or any grammatical deviations therefrom are used non-exclusively. Accordingly, these terms can refer either to situations in which, besides the features introduced by these terms, no further features are present, or to situations in which one or more further features are present. For example, the expression "A exhibits B", "A has B", "A comprises B" or "A includes B" can refer either to the situation in which, apart from B, no further element is present in A (i.e., to a situation in which A exclusively consists of B), or to the situation in which, in addition to B, one or more further elements are present in A, for example element C, elements C and D or even further elements.

Furthermore, it should be noted that the terms "at least one" and "one or more" and grammatical modifications of these terms, if they are used in association with one or more elements or features and are intended to express the fact that the element or feature can be provided once or more than once, generally are used only once, for example when the feature or element is introduced for the first time. When the feature or element is subsequently mentioned again, the corresponding term "at least one" or "one or more" is generally no longer used, without this restricting the possibility that the feature or element can be provided once or more than once.

Furthermore, in the following text, the terms "preferably", "in particular", "for example" or similar terms are used in conjunction with optional features, without alternative embodiments being restricted thereby. In this regard, features which are introduced by these terms are optional features, and the scope of protection of the claims, and in particular of the independent claims, is not intended to be restricted by these features. In this regard, the invention, as will be recognized by a person skilled in the art, can also be carried out using other configurations. In a similar way, features which are introduced by "in one embodiment of the invention" or by "in one exemplary embodiment of the invention" are understood as optional features, without alternative configurations or the scope of protection of the independent claims being intended to be restricted thereby. Furthermore, all of the possible ways of combining the features introduced by these introductory expressions with other features, be they optional or non-optional features, are intended to remain unaffected by these introductory expressions.

In a first aspect of the present invention, a handling module for loading a conveying apparatus of a conveyor dishwasher is proposed. The handling module comprises:
A. at least one turning wheel for turning at least one tableware item, wherein the turning wheel has at least one tableware-item compartment;
B. at least one feeding ramp for feeding the tableware item to the turning wheel, for example under the action of gravity; and
C. at least one charging ramp for transferring the tableware item from the turning wheel to a conveying apparatus of the conveyor dishwasher, wherein the charging ramp has at least one disposal opening.

The turning wheel is arranged between the feeding ramp and the charging ramp, wherein the turning wheel is designed to receive the tableware item fed via the feeding ramp in the tableware-item compartment in an orientation with a use side facing upward, wherein the turning wheel is also designed to turn the tableware item and to place it onto the charging ramp with the use side facing downward, wherein, when placed on the use side, waste that is present on the tableware item can be disposed of through the disposal opening on account of its gravitational force.

The term "handling module" as it is used here is a further term which is to be accorded its usual and common meaning as it is understood by a person skilled in the art. The term is not restricted to a specific or adapted meaning. Without restriction, the term may relate in particular to any unit that is designed to perform a handling function for handling an object. In particular, the handling module may be a unit that is designed to act, for example act non-destructively, on an object to be handled, for example on the tableware item. The action may include changing the spatial position and/or orientation and/or changing a state of the object, for example cleaning or pre-cleaning.

The term "handling function" as it is used here is a further term which is to be accorded its usual and common meaning as it is understood by a person skilled in the art. The term is not restricted to a specific or adapted meaning. Without restriction, the term may relate in particular to a procedure within which the washware is handled in one or more specific ways. By way of example, the type of handling may be selected from the following group: Reorienting the washware and/or tableware item; placing the washware and/or the tableware item; emptying the washware and/or tableware item, for example for the purpose of cleaning and/or pre-cleaning and/or removing objects. Thus, the handling module may be designed, for example, to act on a position and/or alignment and/or state of the object to be handled, in particular the washware and/or tableware item.

The term "loading" as it is used here is likewise a further term which is to be accorded its usual and common meaning as it is understood by a person skilled in the art. The term is not restricted to a specific or adapted meaning. Without restriction, the term may relate in particular to a procedure, within which at least one type of ware, especially washware and/or one or more tableware items in this case, is introduced into a device or deposited onto an apparatus. In particular, loading can be fully or partially automatic.

The term "conveying apparatus" as it is used here is likewise a further term which is to be accorded its usual and common meaning as it is understood by a person skilled in the art. The term is not restricted to a specific or adapted meaning. Without restriction, the term may relate in particular to an apparatus which is designed to convey at least one other apparatus or at least one other element, especially washware and/or one or more tableware items, and/or to drive a movement of the other apparatus or of the other element. The conveying apparatus may in particular comprise at least one drive element, for example at least one drive element which circulates through the cleaning chamber. In particular, the conveying apparatus, for example the drive element, may comprise at least one element selected from the group consisting of: a conveyor belt; transport rollers, in particular driven transport rollers; a link chain; a latch conveying system. By way of example, conveyance in this case may be continuous or discontinuous or take place in cycles, and so for example use can be made of continuously operating conveyor dishwashers or dishwashers operating in cycles, for example. By way of example, the conveying direction may be a main direction of movement of the washware within a cleaning chamber of the conveyor dishwasher. The conveying direction may be fixedly prescribed or may also change, for example locally or over time. By way of example, the conveying direction may be directed from an inlet of the conveyor dishwasher to an outlet.

The term "dishwasher", also referred to in general as a "cleaning apparatus", as it is used here is a further term which is to be accorded its usual and common meaning as it is understood by a person skilled in the art. The term is not restricted to a specific or adapted meaning. Without restriction, the term may relate in particular to an apparatus that is configured to remove adhering macroscopic or else microscopic contamination from washware, for example one or more tableware items, or to at least partially eliminate such contamination. Additionally, there may be an optional disinfecting action. In particular, the dishwasher may be in the form of a dishwasher for tableware.

Accordingly, the term "conveyor dishwasher" as it is used here is a further term which is to be accorded its usual and common meaning as it is understood by a person skilled in the art. The term is not restricted to a specific or adapted meaning. Without restriction, the term may in particular relate to a dishwasher within the meaning of the definition given above, which comprises at least one conveying apparatus. In particular, the conveyor dishwasher may have at least one cleaning chamber, for example at least one cleaning tunnel, in which at least one cleaning fluid is applied to the washware and/or to one or more tableware items, in particular by means of at least one application apparatus. The conveying apparatus may be designed to convey the washware through the cleaning chamber.

The term "washware" as it is used here is a further term which is to be accorded its usual and common meaning as it is understood by a person skilled in the art. The term is not restricted to a specific or adapted meaning. Without restriction, the term may relate in particular to any object that can be cleaned by means of the cleaning apparatus. In this case, one object may be cleaned or multiple objects may be cleaned simultaneously or sequentially. The term "tableware item" may in particular be accorded the same meaning as the term "washware", and therefore the terms "washware" and "tableware item" can be used interchangeably, for example. In particular, the washware may be objects that are used directly or indirectly for the preparation, storage, presentation or giving of meals, that is to say for example tableware, flatware, trays, bowls, glasses, cups, pots, pans, or similar objects. Accordingly, the cleaning apparatus may in particular be in the form of a dishwasher for tableware, for example a dishwasher for tableware for commercial use in large-scale kitchens or kitchens for mass catering. Other configurations of the cleaning apparatus and/or of the washware are also possible as a matter of principle.

The term "turning wheel" as it is used here is a further term which is to be accorded its usual and common meaning as it is understood by a person skilled in the art. The term is not restricted to a specific or adapted meaning. Without restriction, the term may relate in particular to any system and/or element that is designed to change the orientation of at least one object in space by rotating it about at least one axis. Thus, the turning wheel may be designed, for example, to turn the tableware item. In this respect, the term "to turn" as it is used here is a further term which is to be accorded its usual and common meaning as it is understood by a person skilled in the art. The term is not restricted to a specific or adapted meaning. Without restriction, the term may relate in particular to a procedure in which an orientation and/or a position of any desired object, for example any desired element, is changed in such a way that a top and a bottom side of the element are swapped over. It is thus possible for the top side, which faced upward before the turning operation, of the element to be the bottom side, which faces downward, of the element after the turning operation, and vice versa. In particular, the turning operation may be a procedure in which the object and/or the element are rotated by approximately 180° about a horizontal axis, in particular about a horizontal axis that runs orthogonally with respect to a direction of gravity. For example, the turning operation may include a rotation $\varphi$ of the object by $120° \leq \varphi \leq 240°$, for example by $150° \leq \varphi \leq 210°$, in particular by $160° \leq \varphi \leq 200°$, preferably by $175° \leq \varphi \leq 185°$.

In particular, the turning makes it possible to change the orientation of the tableware item from an upwardly open position to a downwardly open position. The term "upward (ly)" as it is used here is a further term which is to be accorded its usual and common meaning as it is understood by a person skilled in the art. The term is not restricted to a specific or adapted meaning. Without restriction, the term may in particular relate to an alignment in which anything present on or in the tableware item does not fall off or out on account of the action of gravity. For example, an upwardly aligned tableware item may be able to hold its contents and retain them under the action of gravity, for example as a result of a concave side of the tableware item.

The term "tableware-item compartment" as it is used here is a further term which is to be accorded its usual and common meaning as it is understood by a person skilled in the art. The term is not restricted to a specific or adapted meaning. Without restriction, the term may relate in particular to a zone, for example a region, of the turning wheel that is designed to hold at least one tableware item. In particular, the tableware-item compartment may be designed to hold exactly one tableware item. Therefore, the tableware-item compartment may be an opening into which the tableware item can be inserted, for example which is suitable for receiving the tableware item therein. The turning wheel may have a plurality of tableware-item compartments, for example.

The term "feeding ramp" as it is used here is a further term which is to be accorded its usual and common meaning as it is understood by a person skilled in the art. The term is not restricted to a specific or adapted meaning. Without restriction, the term may relate in particular to an inclined surface, for example a oblique plane, over which any desired element, for example a tableware item, can glide and/or slide. For example, the feeding ramp may be a slide for tableware items. In this respect, the feeding ramp may have a smooth surface, for example a smooth surface that, in whole or in part, may be in the form of a metallic surface, for example a stainless steel surface, and/or a smooth surface of another material, for example a plastics material. As an alternative or in addition, however, other configurations and/or materials for the surface are also possible. As an alternative or in addition, however, the feeding ramp may also be configured with one or more rollers or other elements that assist gliding or sliding, for example rails, elongate projections or grooves. The feeding ramp may preferably be designed to allow the tableware item to be fed to the turning wheel.

The term "charging ramp" as it is used here is a further term which is to be accorded its usual and common meaning as it is understood by a person skilled in the art. The term is not restricted to a specific or adapted meaning. Without restriction, the term may relate in particular to a unit that transfers at least one tableware item from the turning wheel to the conveying apparatus of the conveyor dishwasher. In particular, the charging ramp may for example bring the at least one tableware item from the turning wheel to the conveying apparatus in the opposite direction to or in the same direction as the action of gravity. The charging ramp may for example have a form similar to a conveyor belt, for example to a conveyor belt than runs obliquely upward or downward. As an alternative or in addition to at least one conveyor belt, the charging ramp may however also have one or more rollers, for example, which may be in the form of passive rollers or driven rollers. In turn alternatively or additionally, the charging ramp may however also, in whole or in part, be in the form of a slide or gliding ramp.

The term "disposal opening" as it is used here is a further term which is to be accorded its usual and common meaning as it is understood by a person skilled in the art. The term is not restricted to a specific or adapted meaning. Without restriction, the term may relate in particular to a cutout and/or opening through which at least one material is deposited, in particular disposed of The disposal opening may for example be an opening through which waste can fall under the action of gravity. Thus, it is possible to dispose of waste, in particular food waste, held on the at least one tableware item through the disposal opening, on account of its gravitational force.

The term "use side" as it is used here is a further term which is to be accorded its usual and common meaning as it is understood by a person skilled in the art. The term is not restricted to a specific or adapted meaning. Without restriction, the term may relate in particular to a functional surface of an object employed when the object is being used, in particular when the object is being utilized. By way of example, the use side of a tableware item may comprise that surface and/or side of the tableware item that bears the meals. Thus, the use side of a plate may be in particular the inner surface of the plate on which the meals are arranged, and the use side of a cup may be for example the inner surface of the cup opening, in which the liquid is held when the cup is full. In the case of a tray, the use side is preferably that side on which conventional tableware items, such as plates, cups and glasses, can be set while the tray is being used. Conventionally, the use side of the at least one tableware item may be that side of the tableware item that is contaminated by food residue after eating, in particular after a meal.

The term "to place on(to)" as it is used here is a further term which is to be accorded its usual and common meaning as it is understood by a person skilled in the art. The term is not restricted to a specific or adapted meaning. Without restriction, the term may relate in particular to a procedure in which any desired object is placed on another object as a result of a spatial movement. The placing-on operation may in particular comprise a setting-down and/or laying-down operation. In particular, the placing on may be effected in such a way that the placed-on object has a residual speed or a residual impulse when it impacts the surface onto which it is to be placed, with the result that the placed-on object is abruptly braked. This type of placing-on operation may also be referred to as an "impacting operation", as will be explained in more detail below.

It is thus possible to design the turning wheel in particular such that it causes the tableware item to impact the charging ramp with the use side facing downward. The term "to impact" as it is used here is a further term which is to be accorded its usual and common meaning as it is understood by a person skilled in the art. The term is not restricted to a specific or adapted meaning. Without restriction, the term may relate in particular to a placing-on procedure, an impulse being transferred to the other object when an object is placed thereon. In particular, a movement of the object to be subjected to a impacting procedure can be abruptly braked by the other object when it is placed on the other object. By causing the tableware item to impact the charging ramp with the use side facing downward, it is possible for example for contamination, in particular food residue, arranged on the use side to be propelled further by the abrupt braking of the movement. It is thus possible for the contamination to be detached and removed from the use side of the tableware item, for example. It is thus possible for the turning wheel to be designed in particular in such a way that the tableware item impacts the charging ramp at a speed of 0.5 m/a to 4 m/s, in particular 2 m/s, in particular with the use side facing downward.

The turning wheel may comprise in particular a plurality of radially extending conveying fingers. The term "conveying finger" as it is used here is a further term which is to be accorded its usual and common meaning as it is understood by a person skilled in the art. The term is not restricted to a specific or adapted meaning. Without restriction, the term may relate in particular to an elongate element, for example similar to a finger. This conveying finger may extend from a surface of the turning wheel into space. By way of example, the conveying finger may have one or more bulges and/or corners, preferably even one or more undercuts, by means of which the conveying finger is able to convey and/or move, preferably carry along, at least one object. In particular, the conveying finger may be configured in such a way that it carries along the at least one object, that is to say transmits its movement to the object. It is thus possible for the conveying finger to transmit its own movement, for example, to the object to be conveyed by means of the at least one bulge and/or corner, for example, by hooking onto the object and/or hooking into the object, for example. In particular, the conveying fingers may extend radially outward from an axis of rotation of the turning wheel, for example from a central axis of the turning wheel. The conveying fingers may form the at least one tableware-item compartment, for example. It is thus possible for example for two conveying fingers to form the tableware-item compartment and to convey the at least one tableware item, preferably by hooking into it. Other ways of carrying it along, for example by friction and/or active clamping in place, are likewise conceivable.

The turning wheel may comprise in particular a rotatable drum with a circumferential surface, wherein the conveying fingers extend radially from the circumferential surface. In particular, the conveying fingers may extend radially outward from a rotatable cylindrical drum.

As an alternative or in addition, the turning wheel may comprise two disks from which the conveying fingers extend radially, for example, similar to the teeth of two gearwheels. Disks formed in this way may be adapted to a geometry of the at least one tableware item, for example. In particular, a spacing between the disks of the turning wheel may be adapted to the geometry of the tableware item, for example, and thus can be used for different tableware item geometries, preferably adaptively. In general, the width of the turning wheel, for example an extent perpendicularly with respect to a movement direction of the tableware item, can therefore be settable and/or changeable.

The turning wheel may have a plurality of carrying-along means, the carrying-along means being able to form the at least one tableware-item compartment, for example. The term "carrying-along means" as it is used here is a further term which is to be accorded its usual and common meaning as it is understood by a person skilled in the art. The term is not restricted to a specific or special meaning. Without restriction, the term may relate in particular to any desired shaped element designed to transmit its own movement to at least one object. By way of example, the carrying-along means may be configured in such a way that a movement of the carrying-along means can be transmitted to at least one object, for example a tableware item. In particular, the carrying-along means may be an element able to carry along, in particular entrain, the tableware item owing to its shape and/or configuration, for example, as a result of its own movement. In particular, the carrying-along means may be an element extending radially outward from the surface of the turning wheel, for example. The carrying-along means is preferably configured in such a way that a movement of the carrying-along means, in particular a rotational movement of the turning wheel, can be transmitted to the at least one tableware item.

The carrying-along means may be fastened to the turning wheel preferably interchangeably, for example by being screwed on. As an alternative, the turning wheel having the carrying-along means may also be made in one piece, in particular completely in one piece.

In particular, the configuration of the turning wheel with a plurality of carrying-along means may be for example an alternative to a configuration of the turning wheel with the conveying fingers described above. A mixed configuration of the turning wheel, in which both carrying-along means and conveying fingers are present, is possible.

Each of the carrying-along means may have at least one turning geometry, for example. The term "turning geometry", also referred to as "turning contour", as it is used here is a further term which is to be accorded its usual and common meaning as it is understood by a person skilled in the art. The term is not restricted to a specific or special meaning. Without restriction, the term may relate in particular to a form and/or a shape, preferably a surface contour, of any desired element designed to change a spatial orientation of at least one object, in particular to turn this object. Reference is made to the statements made above with respect to the term "to turn". By way of example, the carrying-along means having the turning geometry may be designed to engage in an upper side of the tableware item, for example in a concave side of the tableware item, and thus be suitable, for example, to turn the tableware item in conjunction with a rotation of the turning wheel.

Each of the carrying-along means may have at least one hold-down geometry, for example. The term "hold-down geometry", also referred to as "hold-down contour", as it is used here is a further term which is to be accorded its usual and common meaning as it is understood by a person skilled in the art. The term is not restricted to a specific or special meaning. Without restriction, the term may relate in particular to a form and/or a shape, preferably a surface contour, of any desired element designed to hold and/or support at least one object, in particular during the turning operation. By way of example, the carrying-along means having the hold-down geometry may be designed to engage on and/or bear against a lower side of the tableware item, for example to make contact with the tableware item on a convex side of the tableware item. It is thus possible, for example, for the carrying-along means having the hold-down geometry to be in particular in the form of a hold-down device.

By way of example, each of the carrying-along means may also have both at least one turning geometry and at least one hold-down geometry. In particular, the turning geometry and the hold-down geometry may be arranged on opposite sides of the respective carrying-along means, for example. It is thus possible for each carrying-along means to have a turning geometry on one side and a hold-down geometry on an opposite side, for example. By way of example, a leading geometry of the carrying-along means in a circumferential direction of the turning wheel, in particular in relation to a preferred direction of rotation of the turning wheel, may have a hold-down geometry and a trailing geometry of the carrying-along means may have a turning geometry.

In particular, the carrying-along means may be reversibly, for example interchangeably, connectible to the turning wheel. By way of example, it can be advantageous for the carrying-along means to be interchangeable in order to make it possible to adapt the turning wheel to a variety of tableware items, for example differently shaped tableware items. It is thus possible for the carrying-along means to be able to be secured to the turning wheel using a connecting means, for example by screws and/or plug connectors.

The turning wheel may also have a plurality of guide structures. By way of example, the turning wheel having the guide structures may be made in one piece, preferably completely in one piece. In particular, the guide structures and the carrying-along means of the turning wheel may form, for example conjointly, the at least one tableware-item compartment. The term "guide structure" as it is used here is a further term which is to be accorded its usual and common meaning as it is understood by a person skilled in the art. The term is not restricted to a specific or special meaning. Without restriction, the term may relate in particular to any desired element that is designed, on account of its form and/or shape, preferably its surface structure, to guide and/or deflect the movement of at least one object, preferably to restrict a movement of the object in at least one direction. In particular, the guide structure may be adapted to a shape and/or a form of the object, for example. It is thus possible for the guide structure to be adapted to the geometry of the tableware item, for example, and thus to be usable for different tableware item geometries, preferably adaptively. In particular, the guide structure may thus also be adapted for example to the shape and/or the form of a multiplicity of tableware items, for example different tableware items, for example to the shape and/or form of differently configured plates, cups, dishes, bowls and/or glasses.

Each of the guide structures may have at least one respective guide contour. The term "guide contour" as it is used here is a further term which is to be accorded its usual and common meaning as it is understood by a person skilled in the art. The term is not restricted to a specific or special meaning. Without restriction, the term may relate in particular to a delimitation, in particular to a two-dimensional or three-dimensional boundary, of any element along which a movement of an object can be guided, in particular the movement of which can be delimited. In particular, in this respect the at least one guide contour may be for example a delimitation which is formed on the guide structure and designed to delimit a movement of the tableware item and/or along which the movement of the tableware item can be guided. It is thus possible for the guide structure to have different geometries and/or forms, for example, in particular geometries and/or forms adapted to the geometry of the tableware item, preferably to different tableware item geometries.

It is thus possible, for example, for the guide contour to have a radius and/or a diameter corresponding to an outer radius and/or an outer diameter of the tableware item. As an alternative or in addition, the guide contour of the guide structure may have a external form, for example an enveloping geometry, of the tableware item. Furthermore alternatively or additionally, the guide contour may have for example a clear outline, in particular a clearance profile, of the tableware item. By way of example, the guide contours may be adapted to a round form and/or to an angular form of tableware items, for example plates, cups, dishes, bowls and/or glasses. It is preferably possible for the guide structures to be adapted both to round and to angular tableware items, in particular both to a round-shaped tableware item and to an angularly shaped tableware item, for example to bowls, dishes and/or cups. Also possible is adaptation to other geometric forms, such as for example to tableware items with a polygonal basic form, in particular a multiangular basic form, for example a triangular and/or hexagonal basic form. Other adaptations are possible.

In particular, the guide structures may be reversibly, for example interchangeably, connectible to the turning wheel. By way of example, it can be advantageous for the guide structures to be interchangeable in order to make it possible to adapt the turning wheel to a variety of tableware items, for example differently shaped tableware items. It is thus possible for the guide structures to be able to be secured to the turning wheel using a connecting means, for example by screws and/or plug connectors.

By way of example, the guide structures of the turning wheel may each have at least three guide contours, for example at least one concave guide contour and two guide edges. In particular, the guide structures may have a centrally arranged, concave guide contour, it being possible for the central arrangement to relate in particular to the tableware item, in particular to the geometry and/or form of the tableware item. The guide structures may also each have two guide edges. The term "guide edge" as it is used here is a further term which is to be accorded its usual and common meaning as it is understood by a person skilled in the art. The term is not restricted to a specific or special meaning. Without restriction, the term may relate in particular to an edge and/or boundary assigned to a guide structure, for example to a guide contour, which forms a termination and/or periphery of a guide structure. It is thus possible for the guide structures to each have two symmetrically arranged guide edges, which delimit the guide structure, in particular the form and/or geometry of the guide structure. In this respect, the guide edges may be arranged at the side of the central concave guide contour. In particular, a configuration of this type of the guide structures of the turning wheel may serve, for example, to align the tableware item centrally when it is being turned by the turning wheel, and thus facilitate processing, for example.

In particular, the turning wheel may have a smooth surface, for example. It is thus possible for the turning wheel to have a surface which can be cleaned readily. In particular, the surface of the turning wheel may be configured, for example, to prevent and/or reduce adhesion of waste, in particular food residues. Further, the turning wheel may be in the form of a closed body, for example. It is thus possible for the turning wheel to have for example a closed surface, in particular envelope, for example to be in the form of a closed body.

The turning wheel may have a basic body produced in one piece, for example. It is thus possible for the turning wheel with the guide structures to form a one-piece body, for example. In particular, the turning wheel may form for example a one-piece body, preferably made of plastic, for example a plastic for reducing noise and/or reducing wear, for example for avoiding wear of the tableware items. In particular, the turning wheel may comprise at least one drive. The term "drive" as it is used here is a further term which is to be accorded its usual and common meaning as it is understood by a person skilled in the art. The term is not restricted to a specific or adapted meaning. Without restriction, the term may relate in particular to any desired element designed to generate movement, for example by energy conversion. It is thus possible for the drive to have a motor, for example. In particular, the drive may be designed for example to rotate the turning wheel about at least one axis, preferably to drive the rotation of the turning wheel about the at least one axis. By way of example, the drive may continuously drive the turning wheel. It is thus possible for the drive to be designed in particular to drive the turning wheel uniformly, in particular at a constant speed. By way of example, the drive may also have one or more further elements, for example one or more transmission elements, such as couplings, gearwheels, worm gears, belts, in particular toothed or friction belts, chains or the like.

The handling module may also have at least one disposal opening, for example. In particular, the waste can be disposed of via the disposal opening into at least one disposal apparatus, for example into a waste treatment system, on account of its gravitational force, for example into at least one disposal apparatus selected from the group consisting of a disposal shaft and a disposal container; a comminution device, for example a grinding unit.

In particular, the disposal apparatus may be incorporated in the handling module. The handling module may comprise the disposal apparatus, for example. It is thus possible for the handling module to have for example a comminution device and a tank for intermediately storing comminuted waste. As an alternative or in addition, the handling module may have further elements such as at least one pump and/or valve, in particular for use in the disposal apparatus. The handling module may be connected in particular to an automatic system for disposing of the waste. By way of example, the handling module may also comprise the automatic disposal system, with the result that staff, for example for emptying disposal containers, can be dispensed with.

The charging ramp, at least partially, may be in the form of a slide. In particular, the charging ramp may be configured in such a way that the at least one tableware item can slide from the turning wheel to the conveying apparatus of the conveyor dishwasher. In particular, the charging ramp, in whole or in part, may be in the form of an elastic slide.

By way of example, the charging ramp may have an inclination $\alpha$ with respect to a horizontal plane. In particular, the inclination $\alpha$ with respect to a horizontal plane may amount to $5°\leq\alpha\leq70°$. By way of example, the inclination $\alpha$ with respect to a horizontal plane may amount to $10°\leq\alpha\leq45°$. Preferably, the inclination $\alpha$ with respect to a horizontal plane may amount to $15°\leq\alpha\leq35°$. Particularly preferably, the inclination $\alpha$ with respect to a horizontal plane may amount to $\alpha=25°$.

In general, the charging ramp may be configured with at least one elastic impact surface, for example. Preferably, the charging ramp, in whole or in part, may have an elastic and/or resilient form. In particular, the charging ramp may be in the form of an elastic slide, for example by using at least one resilient and/or elastic material, for example a resilient and/or elastic plastic. In particular, the resilient and/or elastic plastic may comprise at least one resilient and/or elastic material selected from the group consisting of: polyethylene, polypropylene, polyurethane, silicone, rubber. Thus, for example, an elastic configuration of the charging ramp makes it possible to cushion a movement of the at least one tableware item gliding down the charging ramp when it impacts. By way of example, an elastic configuration of the charging ramp may also dampen and/or alleviate noise generation.

Further, the feeding ramp, at least partially, may also be in the form of a slide. It is thus possible to configure the feeding ramp in such a way, for example, that the at least one tableware item can slide down the feeding ramp to the turning wheel. In particular, the feeding ramp may be in the form of an elastic slide, for example with a smooth surface, which is resiliently mounted and/or which itself is produced from an elastic material. In turn alternatively or additionally, the feeding ramp may however also be configured, in whole or in part, with rollers.

Preferably, the feeding ramp, in whole or in part, may have an elastic and/or resilient form. In particular, the feeding ramp may be in the form of an elastic slide, for example by using at least one resilient and/or elastic material, for example a resilient and/or elastic plastic. In particular, the resilient and/or elastic plastic may comprise at least one resilient and/or elastic material selected from the group consisting of: polyethylene, polypropylene, polyurethane, silicone, rubber. Thus, for example, an elastic configuration of the feeding ramp makes it possible to cushion a movement of the at least one tableware item sliding down the feeding ramp. By way of example, an elastic configuration of the feeding ramp may also dampen and/or alleviate noise generation.

By way of example, the feeding ramp may have an inclination $\beta$ with respect to a horizontal plane. In particular, the inclination $\beta$ with respect to a horizontal plane may amount to $5°\leq\beta\leq70°$. By way of example, the inclination $\beta$ with respect to a horizontal plane may amount to $10°\leq\beta\leq45°$. Preferably, the inclination $\beta$ with respect to a horizontal plane may amount to $15°\leq\beta\leq35°$. Particularly preferably, the inclination $\beta$ with respect to a horizontal plane may amount to $\beta=25°$.

The turning wheel may engage in particular at least partially in the feeding ramp. The term "to engage" as it is used here is a further term which is to be accorded its usual and common meaning as it is understood by a person skilled in the art. The term is not restricted to a specific or adapted meaning. Without restriction, the term may relate in particular to an overlap operation, in which, in an overlap region, a trailing unit already takes up guidance of an object although the leading unit still guides the object. In particular, it is possible, for example, for the turning wheel to engage at least partially, in particular within an overlap region, in the feeding ramp, in order to already take up guidance of the tableware item at least partially, for example in the overlap region. The engaging operation may also be referred to as through-penetration. In particular, the engaging operation makes it possible to ensure secure transfer of the tableware item from the feeding ramp to the turning wheel.

By way of example, it is possible in particular for the conveying fingers of the turning wheel to engage in the feeding ramp. It is thus possible for the conveying fingers of the turning wheel to engage preferably in slots in the feeding ramp, for example in extra slots in the feeding ramp provided for engagement.

In particular, the carrying-along means of the turning wheel may engage in the feeding ramp. It is thus possible for the carrying-along means of the turning wheel to engage preferably in slots in the feeding ramp, for example in extra slots in the feeding ramp provided for engagement.

Further, the turning wheel may engage at least partially in the charging ramp, for example. In particular, the turning wheel may engage at least partially in the charging ramp in order to transfer the tableware item to the charging ramp in an overlap region.

In particular, the conveying fingers of the turning wheel may engage in the charging ramp, for example. It is thus possible for the conveying fingers of the turning wheel to engage in particular in slots in the charging ramp, for example.

In particular, the carrying-along means of the turning wheel may engage in the charging ramp. It is thus possible for the carrying-along means of the turning wheel to engage preferably in slots in the charging ramp, for example in extra slots in the charging ramp provided for engagement.

Further, the handling module may have for example at least one tableware-item brake on the feeding ramp and/or transversely in front of the feeding ramp. In particular, the tableware-item brake may be designed to at least temporarily brake the tableware item on the feeding ramp. The term "tableware-item brake" as it is used here is a further term which is to be accorded its usual and common meaning as it is understood by a person skilled in the art. The term is not restricted to a specific or adapted meaning. Without restriction, the term may relate in particular to any desired retaining apparatus designed to at least temporarily retain and/or brake the at least one tableware item.

The tableware-item brake may comprise at least one strip, for example four strip-like brakes, for example a strip-like brake arranged on the feeding ramp and/or in front of the feeding ramp. In particular, in this context the strip-like brakes may extend, for example, transversely with respect to a movement direction of the tableware item.

In particular, the tableware-item brake may comprise two stoppers, for example. In this respect, each of the stoppers may be in the form of fingers, in particular may have an elongate form. By way of example, the stoppers may be arranged at the side of the turning wheel, in particular in the region of the feeding ramp. The stoppers may be arranged for example in whole or in part in the overlap region from the feeding ramp to the turning wheel, in particular in whole or in part in a transfer zone. An arrangement in front of the overlap region is also possible in principle. It is therefore possible for the stoppers to be arranged for example on the feeding ramp, in order to brake the tableware item already before it reaches the turning wheel, for example before it reaches the overlap region between the feeding ramp and the turning wheel.

The stoppers may move parallel to a movement direction of the tableware item, for example. It is thus possible for the stoppers to move in particular parallel to the movement direction of the at least one tableware item. With respect to a plane of the feeding ramp, for example to a surface of the feeding ramp, the stoppers, in particular the stoppers in the form of fingers, may also move in a direction that deviates from a parallel, for example. It is thus possible to change, for example decrease or increase the size of, a projection of the stopper beyond the plane of the feeding ramp, in particular a projection of the stoppers in the form of fingers, beyond the surface of the feeding ramp while the stoppers are moving. In particular, the projection of the stoppers beyond the surface of the feeding ramp in the movement direction of the at least one tableware item can become smaller, for example become smaller from an upper position to a lower position.

By way of example, the two stoppers of the tableware-item brake may move in parallel. In particular, it is possible to center the tableware items, in particular round-shaped tableware items such as round plates and/or round dishes, advantageously with respect to the turning wheel, for example by way of the two parallel-moving stoppers.

In particular, each one of the at least two stoppers may be assigned a dedicated conveying device running around the periphery, for example a chain. In this respect, the dedicated chain, running around the periphery and assigned to each one of the at least two stoppers, may drive the movement of the stoppers, in particular the movement parallel to a movement direction of the tableware item. By way of example, stoppers driven in this way may preferably move circumferentially.

As an alternative or in addition, the at least two stoppers, in particular at least one pair of stoppers, may also be secured to a common carrier strip. In this respect, the common carrier strip may be driven by at least one chain, for example. By way of example, stoppers driven in this way may preferably move circumferentially. It is thus possible for the two stoppers secured to a common carrier strip to be driven for example via the chain, in particular via a common chain. With a configuration of this type, it is for example advantageously possible for the chain to be able to be arranged below the feeding ramp. By way of example, in this respect the chain arranged below the feeding ramp can be well protected against contamination, in particular against falling food residues, for example dirt.

The stoppers of the tableware-item brake, in particular the at least two stoppers, may be arranged at the side of the feeding ramp, for example. In this respect, the stoppers may be arranged in particular at the side of the feeding ramp in order to temporarily brake the tableware item by means of frictional forces.

In particular, the tableware-item brake, for example the retaining apparatus, may be synchronized with the turning wheel, for example with the rotation of the turning wheel. In particular, the tableware-item brake may move synchronously with the rotation of the turning wheel.

By way of example, the stoppers of the tableware-item brake may be located in the lower position, in particular in a lower end position, when the turning wheel, in particular the conveying fingers and/or the carrying-along means of the turning wheel, are in a position, e.g. a rotational position, in which the tableware-item compartment of the turning wheel is positioned in such a way that the tableware item can be received in the tableware-item compartment of the turning wheel. It is thus possible for the stoppers to be in particular in the lower position, in particular in the lower end position, when the tableware-item compartment of the turning wheel, for example the tableware-item compartment formed by the conveying fingers and/or the carrying-along means, is open toward the feeding ramp, in particular direct feeding of the tableware item into the tableware-item compartment is enabled. By rotating the turning wheel further, the tableware item held in the tableware-item compartment can now already be conveyed further on, while the tableware-item brake can be moved to an upper end position, for example in the opposite direction to the movement direction of the tableware items on the feeding ramp. In this way, the tableware-item brake may stop and/or brake for example a tableware item that has arrived on the feeding ramp in the meantime, in order to prevent for example the tableware item from bumping against the turning wheel when the tableware-item compartment is closed toward the feeding ramp. When no receiving opening of the turning wheel is positioned toward the feeding ramp, the stops can therefore be in their upper end position, for example. The tableware item braked and/or retained by the tableware-item brake can now be moved on by the movement of the tableware-item brake at a speed such that the tableware item is received in the next free tableware-item compartment of the turning wheel by the synchronous further rotation of the turning wheel. In particular, it is thus possible to move the stopper, for example synchronously, downward in the direction of the axis of the turning wheel while the turning wheel is rotating. When the turning wheel is in a position in which the tableware-item compartment, for example a receiving opening of the turning wheel, is open toward the feeding ramp, the stopper can have reached its lower end position. In this position, the tableware item could consequently then be released and transferred to the turning wheel. As the turning wheel continues to rotate, e.g. with a held tableware item, the stopper can then move in particular back to its upper end position. In this way, it is for example possible to prevent a tableware item moving on the feeding ramp toward the turning wheel from colliding with a conveying finger and/or a carrying-along means, in particular with two conveying fingers, for example with a pair of teeth, of the turning wheel, if this collision were not detected properly.

The handling module can also have at least one tableware-item brake on the charging ramp. In particular, the tableware-item brake on the charging ramp may be designed to brake and/or retain the at least one tableware item on the charging ramp at least temporarily.

The charging ramp may be in the form of an active charging ramp, for example. By way of example, the active charging ramp can transfer the tableware item from the turning wheel to the conveying apparatus of the conveyor dishwasher in that the charging ramp moves with the tableware item in whole or in part, in particular by way of conjointly running elements on which the tableware item can be conveyed, for example by way of at least one conveyor belt. It is thus possible, for example, for two round belts running in parallel to be used in the charging ramp in order to transfer the tableware item from the turning wheel to the conveying apparatus of the conveyor dishwasher, the tableware item turned by the turning wheel being placed on the two round belts and thus being able to be conveyed further to the conveying apparatus, in particular to the dishwasher. In particular, the charging ramp may also comprise, for example, a belt and/or belts, in particular two spaced-apart belts. As an alternative or in addition, the charging ramp may also have a brake device.

In particular, the charging ramp, for example the active charging ramp, may have at least one driven part. In this respect, the driven part may be selected, for example, from the group consisting of a belt, in particular conveyor belts, for example a nubbed conveyor belt, transport rollers, a link chain. By way of example, the charging ramp with the at least one driven part is suitable for conveying the tableware item upward, preferably to a predetermined height. The charging ramp may thus be designed to convey the tableware item initially upward, in particular counter to the action of gravity, the tableware item being able to tilt, for example, when it reaches the uppermost point and pass onto a downwardly inclined slide. The tableware item may then be fed, for example, to the conveying apparatus of the conveyor dishwasher via the downwardly inclined slide. By way of example, the tableware item can glide and/or slide into the conveying apparatuses, for example into a compartment, provided for the tableware item, of a conveyor belt of the conveying apparatus of the dishwasher via the downwardly inclined slide.

Further design measures may be provided, for example. In particular, it is possible, in order for example to compensate different overall heights and/or relative heights, for example to mount various elevations and/or ramps between individual constituent parts of the handling module, in particular between the feeding ramp and the charging ramp, for example between the feeding belt guiding items out of a dining room and the conveying apparatus of the conveyor dishwasher.

At least one movement sequence within the handling module may be synchronizable with the conveying apparatus of the conveyor dishwasher, for example. It is thus possible in particular to synchronize a sequence of functions in the handling module, for example the rotational movement of the turning wheel with the movement of the conveying apparatus of the conveyor dishwasher. This may be effected by a coupling, for example, which may in particular likewise be included in the handling module. In particular, the coupling may be designed for synchronizing the at least one movement sequence within the handling module with the conveying apparatus of the conveyor dishwasher. The coupling may be selected, for example, from the group consisting of a mechanical coupling, in particular a direct mechanical coupling, an electronic coupling, for example an electronic coupling of drive motors, e.g. using at least one sensor. Other types of coupling are also conceivable.

By way of example, the coupling may have at least one sensor. It is thus possible in particular for the synchronized movement sequence to be performed using at least one sensor. The sensor may be, for example, an electronic sensor, in particular a light scanner. As an alternative or in addition, the use of mechanical sensors is also conceivable.

In particular, it may be necessary for the movement of the tableware items to be synchronized relative to a movement sequence of the conveying apparatus of the conveyor dishwasher, in particular in relation to the conveying of the dishwasher, for example in order to place the tableware items in compartments of the conveying apparatus that are provided for this purpose, in particular to cycle them into fixed compartments of a conveyor belt. For this purpose, it is advantageously possible, for example, to use the sensor described above, in particular the at least one sensor of the coupling. It is thus possible for the sensor to be designed, for example, to detect a position of a tableware item. In particular, the handling tool may be designed to at least temporarily stop, in particular halt, at least one movement, for example a movement of the drive, in whole or in part if the position deviates from a predefined position, for example when the position of the tableware item is incorrect. In the process, it can be possible to discharge the tableware to the feeding ramp regardless, such that a user and/or operator, in particular a staff member, at this location would not be hindered.

In particular, the movement of the conveying apparatus of the conveyor dishwasher, may be a controlled variable, for example predefined by a drive of the conveying apparatus. It is thus possible, in particular, to adapt the movements, for example the movement sequences, within the handling module in a manner corresponding to the movement of the conveying apparatus.

It is also possible for the handling module to comprise at least one transmission, for example. The transmission may in particular be designed to generate and/or to control at least one movement sequence within the handling module. The transmission for generating and/or controlling the movement sequences may be arranged, for example, at the side of the handling module, in particular laterally next to a useful space and/or shaft of the handling module, preferably parallel to a movement direction of the at least one tableware item. Components that are part of the transmission, such as gearwheels, drivers, belts and sensors, may be arranged inside the shaft, for example arranged below the feeding ramp. In this way, for example, a compact structure of the handling module can be made possible. In particular, it would be possible for the handling module in this way to achieve an optimized relationship of external width and useful width, in particular of an inner surface to be utilized by the tableware item. The transmission may be in the form of part of the drive, for example.

The drive, for example the drive of the turning wheel, may be designed in particular to drive the at least one movement sequence within the handling module. By way of example, a movement of the drive can be monitored by means of a rotary encoder. In particular, it is thus possible for the handling module to have a drive with at least one rotary encoder for monitoring the movement of the drive, in particular for monitoring the movement sequences within the handling module. The handling module may also comprise at least one overload protection means, in particular an overload protection means assigned to the drive, for example an overload protection means using current monitoring and/or maximum current delimitation. As an alternative or in addition, the drive, in particular the drive of the handling module that is assigned to the turning wheel, may be configured such that a predefined maximum power cannot be exceeded.

By way of example, the drive, in particular the drive of the handling module that is assigned to the turning wheel, may be designed to be easily releasable in the event of possible jamming and/or congestion. It is thus possible, in particular, for the drive to be designed to allow automated release, for example by reversing a direction of rotation in an automated manner. In particular, in this respect the drive may be, for example, not self-locking. By way of example, it may also be possible for the drive to be configured such that, in the event of possible jamming and/or congestion, a reversal of the direction of rotation by hand is possible, for example by an operator and/or user. It is thus possible to advantageously easily clear jamming and/or congestion, for example triggered by contamination and/or jammed tableware items, in particular by means of the non-self-locking drive.

The handling module may also have at least one wiping device for wiping clean the tableware item. In particular, the wiping device may have at least one driven shaft. It is also possible for the wiping device to comprise, for example, at least one at least partially flexible wiping element secured to the shaft, wherein the wiping element in particular can be designed to make contact with the tableware item. In particular, the wiping element may have, for example, at least partially flexible strip-like elements. The wiping element, for example also referred to as wiper, may comprise in particular at least one flexible material. It is thus possible for the wiping element to be wholly or partially manufactured from the flexible material, for example from a flexible plastic.

The wiping device may preferably comprise at least three wiping elements. In particular, the wiping device may have exactly three wiping elements. It is thus possible for the tableware item to be contacted by three wiping elements secured to the driven shaft, in particular one after another, for example in a consecutive sequence.

The shaft, in particular the driven shaft of the wiping device, may have at least one axis of rotation. By way of example, the axis of rotation of the shaft may be arranged substantially orthogonally with respect to a movement direction of the tableware item, for example with respect to a conveying direction of the tableware item.

In particular, the wiping elements secured to the driven shaft may be secured to the shaft, for example, symmetrically distributed over the shaft circumference. By way of example, the shaft may be driven in such a way that a movement of the at least one wiping element is synchronized with the movement of the tableware item, in particular with at least one movement sequence of the tableware item within the handling module. As an alternative or in addition, the shaft may be driven in such a way that the at least one wiping element performs a movement in the direction of movement of the tableware item or counter to the direction of movement of the tableware item. In particular, the shaft may be driven in such a way that the at least one wiping element is moved either in the direction of movement or counter to the direction of movement of the tableware item when the shaft is rotating.

In particular, the at least one wiping device for wiping the tableware item may be arranged in such a way, for example, that only turned tableware items are wiped clean. By way of example, the wiping device for wiping the tableware item, for example for wiping only turned tableware items, may be arranged under the charging ramp. It is thus possible for the wiping device to be arranged, in particular located, for example under the charging ramp, in particular on an outlet belt after the tableware item has been turned.

In particular, contamination, for example food residues, remaining on the tableware item after the tableware item has been wiped by the at least one wiping device can be rinsed off preferably with a fluid, for example with air and/or water, for example by applying the fluid to the tableware item, for example by means of a nozzle.

In a further aspect of the present invention, a cleaning system for cleaning washware is proposed. The term "cleaning system" as it is used here is a further term which is to be accorded its usual and common meaning as it is understood by a person skilled in the art. The term is not restricted to a specific or adapted meaning. Without restriction, the term may in particular relate to a system within the meaning of the definition given above which serves to clean washware. Accordingly, the term "cleaning" as it is used here is a further term which is to be accorded its usual and common meaning as it is understood by a person skilled in the art. The term is not restricted to a specific or adapted meaning. Without restriction, the term may relate in particular to a procedure during which adhering macroscopic or microscopic contamination is removed from washware, or such contamination is at least partially eliminated. Additionally, there may be an optional disinfecting action.

The cleaning system comprises:
a. at least one handling module according to the present invention, for example according to one or more of the configurations described above and/or according to one or more of the configurations yet to be described in more detail below;
b. at least one conveyor dishwasher, wherein the conveyor dishwasher has at least one cleaning chamber and at least one conveying apparatus for conveying washware, in particular one or more tableware items, from an inlet of the cleaning chamber to an outlet of the cleaning chamber through the cleaning chamber, wherein the conveyor dishwasher is designed to apply at least one cleaning fluid to the washware, in particular to the one or more tableware items, in the cleaning chamber; and
c. at least one conveying system for supplying contaminated washware, in particular the one or more tableware items.

In this respect, the handling module is designed to transfer tableware items supplied by the conveying system to the conveying apparatus of the conveyor dishwasher.

The term "cleaning chamber" as it is used here is a further term which is to be accorded its usual and common meaning as it is understood by a person skilled in the art. The term is not restricted to a specific or adapted meaning. Without restriction, the term may relate in particular to a fully or partially closed chamber, within which the cleaning procedure can be carried out in full or in part. In particular, the cleaning chamber may have at least one housing which fully or partially encloses the cleaning chamber. In this case, provision can be made for a single cleaning chamber or, in principle, a plurality of cleaning chambers may also be provided, for example sequentially. By way of example, the cleaning chamber may comprise at least one opening for loading the cleaning chamber with the washware; this at least one opening can also be referred to as inlet. By way of example, this might be an opening with a flap arranged on a front side of the cleaning chamber and/or a top side of the cleaning chamber. As an alternative, hoods for closing the cleaning chamber are also possible, for example within the scope of what are referred to as hood-type dishwashers. In yet a further alternative, the cleaning chamber may also be in the form, for example, of a tunnel in whole or in part, for example within the scope of what are referred to as pass-through dishwashers or conveyor dishwashers, for example a tunnel with an inlet opening and an outlet opening, also referred to as outlet. Other configurations are also possible in principle. Accordingly, the terms "inlet" and "outlet" may relate to regions of the conveyor dishwasher and/or the conveying apparatus of the conveyor dishwasher where the washware enters and leaves the cleaning chamber, respectively. By way of example, the conveying apparatus may protrude beyond the cleaning chamber and be freely accessible in these regions.

The conveyor dishwasher is designed to apply at least one cleaning fluid to the washware in the cleaning chamber. To this end, the conveyor dishwasher may comprise at least one application apparatus in particular, especially within the cleaning chamber. The term "application apparatus" as it is used here is a further term which is to be accorded its usual and common meaning as it is understood by a person skilled in the art. The term is not restricted to a specific or adapted meaning. Without restriction, the term may relate in particular to any desired apparatus, in principle, by means of which the cleaning fluid, for example the cleaning liquid, can be applied to the washware within the cleaning chamber. The application apparatus may in particular comprise at least one nozzle system. Furthermore, the application apparatus may comprise at least one pump and at least one line system for providing cleaning fluid, in particular cleaning liquid, to the nozzle system. In this respect, by way of example, one nozzle system and one line system for applying cleaning fluid from a tank, and also at least one corresponding pump, may be provided here. As an alternative or in addition, cleaning fluid can also be applied for example to at least one nozzle system directly from a feed line, without a pump being required to this end. One or more cleaning zones, through which the washware passes sequentially, for example, may be provided in the cleaning apparatus. By way of example, a single cleaning zone can thus be provided, the cleaning apparatus being designed to use the application apparatus to carry out a cleaning program, in which the washware is held stationary in the cleaning chamber and cleaning fluid is applied to said washware in succession in one or more cleaning steps of the cleaning program in different ways. As an alternative, the washware may also be conveyed in succession through multiple cleaning zones in which cleaning fluid is applied in different ways, for example one or more cleaning zones selected from the group consisting of: a pre-clearing zone; a wash zone; a rinse or final rinse zone, said rinse or final rinse zone being able to be subdivided into a pump final rinse zone and a downstream fresh water final rinse zone. Furthermore, at least one drying step may be provided, which for example can follow the application of the cleaning fluid in the one chamber in the case of the washware being held stationary or which can take place in a drying zone which is downstream of the liquid cleaning zones in the case of the conveyor dishwasher, for example.

The term "cleaning fluid" as it is used here is a further term which is to be accorded its usual and common meaning as it is understood by a person skilled in the art. The term is not restricted to a specific or adapted meaning. Without restriction, the term may relate in particular to a liquid which can provide a cleaning action when it makes contact with the washware. The cleaning fluid may also be referred to as cleaning liquid, for example. In particular, the cleaning fluid may comprise an aqueous liquid, for example water and/or water containing one or more additives, for example containing one or more detergent concentrates and/or final rinse agents and/or disinfectants. The cleaning device may be designed to use a single cleaning liquid or to employ a combination of multiple cleaning liquids. If multiple cleaning liquids are provided, the different cleaning liquids may be applied to the washware at the same time or sequentially. For example, the washware can remain stationary within the cleaning chamber and the various cleaning liquids and/or cleaning fluids can be applied to said washware in succession. As an alternative, the washware, as explained above, may also be conveyed sequentially through multiple cleaning zones in which, for example, different types of cleaning liquid and/or cleaning liquids of different grades of purity are applied to said washware. Different grades of purity can be generated, for example, by a cascade overflow between different tanks of the cleaning apparatus, with a degree of purity preferably increasing in the conveying direction.

The term "conveying system" as it is used here is a further term which is to be accorded its usual and common meaning as it is understood by a person skilled in the art. The term is not restricted to a specific or adapted meaning. Without restriction, the term may relate in particular to any system, in principle, that is designed to supply contaminated washware. This may be a continuous or a discontinuous system. In particular, it may be an automatic system in which washware is supplied automatically. In particular, the conveying system may have at least one element selected from the group consisting of: a conveyor belt; transport rollers, in particular driven transport rollers; a link chain.

The term "supply" as it is used here is a further term which is to be accorded its usual and common meaning as it is understood by a person skilled in the art. The term is not restricted to a specific or adapted meaning. Without restriction, the term may relate in particular to a procedure within which washware to be cleaned is manually or automatically provided to the conveying apparatus and/or the conveyor dishwasher and/or the conveying system. By way of example, this procedure can be implemented by virtue of washware being supplied automatically to the conveying apparatus and/or the conveyor dishwasher by means of a conveyor belt or any other feeding apparatus. As an alternative, however, there may also be a manual supply.

Since the handling module is the handling module according to the present invention, for example according to one or more of the configurations described above and/or according to one or more of the configurations yet to be described in more detail below, reference will be made to the configurations relating to the handling module with respect to further definitions.

In particular, the conveying apparatus of the conveyor dishwasher may have a plurality of conveying compartments. In this case, the charging ramp of the handling module may be designed, for example, to transfer the tableware item into at least one of the conveying compartments. The conveying compartments of the conveyor dishwasher may engage at least partially in the charging ramp in the process, for example. The conveying compartments may also be formed at least partially by conveying fingers, the charging ramp being able to have openings, for example, in particular slots, for the engagement of the conveying fingers.

The turning wheel may be arranged, for example, under the conveying system of the conveyor dishwasher. It is thus possible, for example, for the axis of the turning wheel to be arranged in a position arranged vertically further down than the conveying system of the conveyor dishwasher. As an alternative, the turning wheel may be arranged, for example, above the conveying system of the conveyor dishwasher. An arrangement of the turning wheel in a plane with the conveying system of the conveyor dishwasher is also conceivable.

The conveying apparatus may be selected in particular from the group consisting of: a conveyor belt; transport rollers, in particular driven transport rollers; a link chain.

The conveying apparatus of the conveyor dishwasher may have a plurality of conveying fingers, for example. In this respect, the charging ramp of the handling module may be designed, for example, to transfer the tableware item from the turning wheel to the conveying fingers, in particular to the conveying fingers of the conveying apparatus. The transfer may be effected, in particular, to a deflection roller of the conveying apparatus. In this way, for example, the tableware item may be received by the conveying fingers with the use side facing downward and be placed upright, at least partially, by the conveying apparatus.

The conveying direction of the conveying system for supplying the contaminated washware may run transversely with respect to a conveying direction of the feeding ramp, for example. In this way, for example, the cleaning system can be adapted individually to spatial conditions, for example to a layout of a kitchen.

The cleaning system may furthermore have a feeding unit for feeding a tableware item from the conveying system to the feeding ramp. By way of example, the feeding unit may have at least one slide feeder in this respect.

Furthermore, the cleaning system may be designed, for example, to change a spatial orientation of the use side at least twice.

In a further aspect, a method for cleaning washware is proposed. The method comprises the steps specified in more detail below. These steps may be carried out in the sequence specified. However, a different sequence is also possible as a matter of principle. Furthermore, two or more of the specified method steps may be carried out with a time overlap or simultaneously. Furthermore, one or more of the specified method steps may be carried out once or else repeatedly. In addition to the specified steps, the method may comprise further method steps not mentioned here.

The method comprises the following steps:

i. providing at least one cleaning system according to the invention, for example according to one or more of the configurations described above and/or according to one or more of the configurations yet to be described in more detail below;

ii. supplying washware by means of the conveying system, wherein the washware comprises at least one tableware item;

iii. feeding the tableware item to the turning wheel of the handling module by means of the feeding ramp;

iv. receiving the tableware item fed via the feeding ramp in the tableware-item compartment of the turning wheel in an orientation with the use side facing upward;

v. turning the tableware item by means of the turning wheel;

vi. placing the tableware item onto the charging ramp with the use side facing downward by means of the turning wheel, wherein, when placed on the use side, waste that is present on the tableware item is disposed of through the disposal opening of the charging ramp on account of its gravitational force; and vii. transferring the tableware item from the turning wheel to the conveying apparatus of the conveyor dishwasher by means of the charging ramp.

In particular, in step iii., the tableware item can be fed to the turning wheel of the handling module under the action of gravity. It is thus possible, for example, for the action of gravity to allow the tableware item to glide and/or slide down on the feeding ramp.

It is also possible, in step vi., to cause the tableware item to impact the charging ramp with the use side facing downward, with the result that the waste is subject to a force in the direction of the disposal opening in addition to its own gravitational force and can be discharged from the tableware part by a hammer-like action.

The waste removed in step vi. in particular may be received directly in the handling module and also be further processed there, for example comminuted, and/or transported away.

The proposed handling module for loading a conveying apparatus of a conveyor dishwasher, the proposed cleaning system for cleaning washware, and the proposed method have numerous advantages over known apparatuses and methods of the type specified. In particular, for example, it is possible to reduce or even completely avoid downtimes, congestion and/or idling times of the conveyor dishwasher. In particular, a synchronization of movement sequences within the handling module with the conveying apparatus of the conveyor dishwasher is suitable for reducing or entirely preventing downtimes, congestion and idling times.

Furthermore, the proposed apparatuses and methods can allow the best possible utilization of available structural space, for example of an existing space in a kitchen. In particular, for example, the proposed handling module may achieve an optimum ratio of external width to internal useful width. In this way, for example, best-possible utilization of the useful width, e.g. a surface on the conveying apparatus of the dishwasher, is made possible, in particular when using multiple handling modules, for example one next to another, in the proposed cleaning system.

In general, the operator thus has great flexibility in terms of the design and staffing levels in the scullery. Even for future changes, the proposed configuration offers increased flexibility in comparison with conventional solutions, in particular semi-automatic or fully automatic installations.

For the cleaning system manufacturer, the proposed solution with the handling module offers the option of developing and producing multiple similar components, instead of repeatedly developing and producing new individual specialist installations. Overall, this makes it possible to increase the profitability, and development costs and production costs can be reduced.

As a result of dividing the processes, success can be had in particular also in terms of reducing staffing levels in the scullery and also reducing the burden on the staff. Thus, the amount of work for the staff is generally reduced by breaking up the processes into individual steps, and so moreover more pieces of washware, for example more tableware items, can be processed within the same period of time. Moreover, breaking up the processing steps into small sub-tasks makes it possible to use robots when loading a conveyor dishwasher within the scope of mass catering. The configuration of the handling module can be adapted to the respective prior art such that, for example, robot components can be assigned to those tasks which already currently can be processed by robots. With increasing scope of usability, robot components can support a greater range of tasks, and further handling modules with robotic systems can be used without requiring a complete reconfiguration of the system.

In particular, the proposed apparatuses and methods may be suitable for processing round tableware items. In particular, an arrangement of the conveying fingers that can be adapted individually to the geometry of the tableware items may also make it possible to process any desired geometries of tableware items. By contrast to known apparatuses, it is thus possible in particular to universally process plates, dishes and also trays.

Furthermore, the proposed apparatuses make it possible to allow a structure that is more compact than known apparatuses. In particular, tight positioning of the turning wheels can have the result that the handling module does not exceed an overall width of conventional conveyor dishwashers. In particular, it is also possible, for example, for a plurality of proposed handling modules arranged next to one another not to exceed the overall width of conventional conveyor dishwashers, in particular the overall width of conventional conveying apparatuses of conveyor dishwashers.

Furthermore, the proposed apparatuses make it possible, for example, to dispense with additional conveying devices, such as conveyor belts. It is thus possible, in particular, for a feed of the washware, e.g. the tableware items, via a slide, which e.g. has slots corresponding to the fingers of the turning wheel, to allow the washware to be seized by the fingers of the turning wheel completely and/or without interruption, by contrast to conventional apparatuses.

In particular, the waste, for example the food residues, can be separated from the use side of the tableware item in the proposed apparatus without the use of water. In particular, in this way the apparatuses and methods proposed in the present document may allow, for example, the tableware items to be cleaned so as to conserve more resources. In particular, a clearing function with water can be dispensed with, for example.

Furthermore, the proposed apparatuses and methods may be more lightweight, for example, than conventional apparatuses and methods, for example have a more lightweight structure. In particular, the proposed apparatuses and methods, for example by virtue of this more lightweight structure, can be used in a more environmentally friendly manner and/or consume less energy. It is thus possible, in particular, for a low torque to be required.

Furthermore, the proposed apparatuses and methods may be easier to clean, for example, in particular allow easier cleaning, for example have good cleanability. In particular, gentle cleaning can be enabled, for example by virtue of the smooth surface of the turning wheel.

In summary and without restricting further possible configurations, the following embodiments are proposed:

Embodiment 1. A handling system for loading a conveying apparatus of a conveyor dishwasher, comprising:
  A. at least one turning wheel for turning at least one tableware item, wherein the turning wheel has at least one tableware-item compartment;
  B. at least one feeding ramp for feeding the tableware item to the turning wheel, for example under the action of gravity;
  C. at least one charging ramp for transferring the tableware item from the turning wheel to a conveying apparatus of the conveyor dishwasher, wherein the charging ramp has at least one disposal opening,
  wherein the turning wheel is arranged between the feeding ramp and the charging ramp, wherein the turning wheel is designed to receive the tableware item fed via the feeding ramp in the tableware-item compartment in an orientation with a use side facing upward, wherein the turning wheel is also designed to turn the tableware item and to place it onto the charging ramp with the use side facing downward, wherein, when placed on the use side, waste that is present on the tableware item can be disposed of through the disposal opening on account of its gravitational force.

Embodiment 2. The handling module according to the preceding embodiment, wherein the turning wheel is designed to cause the tableware item to impact the charging ramp with the use side facing downward.

Embodiment 3. The handling module according to either one of the preceding embodiments, wherein the turning wheel has a plurality of radially extending conveying fingers, wherein the conveying fingers form the at least one tableware-item compartment.

Embodiment 4. The handling module according to the preceding embodiment, wherein the turning wheel comprises a rotatable drum with a circumferential surface, wherein the conveying fingers extend radially from the circumferential surface.

Embodiment 5. The handling module according to one of the two preceding embodiments, wherein the turning wheel comprises at least two disks from which the conveying fingers extend radially.

Embodiment 6. The handling module according to embodiment 1 or 2, wherein the turning wheel has a plurality of radially extending carrying-along means, wherein the carrying-along means form the at least one tableware-item compartment.

Embodiment 7. The handling module according to the preceding embodiment, wherein each of the carrying-along means has at least one turning geometry.

Embodiment 8. The handling module according to one of the two preceding embodiments, wherein the carry-along means have at least one hold-down geometry.

Embodiment 9. The handling module according to one of the three preceding embodiments, wherein the turning wheel has a plurality of guide structures, wherein the guide structures and the carrying-along means form the at least one tableware-item compartment.

Embodiment 10. The handling module according to the preceding embodiment, wherein each of the guide structures has at least one guide contour, preferably three guide contours.

Embodiment 11. The handling module according to the preceding embodiment, wherein each of the guide contours has at least one concave guiding contour and two guide edges.

Embodiment 12. The handling module according to one of the preceding embodiments, wherein the turning wheel comprises at least one drive.

Embodiment 13. The handling module according to the preceding embodiment, wherein the drive continuously drives the turning wheel.

Embodiment 14. The handling module according to one of the preceding embodiments, wherein the handling module also has at least one disposal opening, wherein the waste can be disposed of via the disposal opening into at least one disposal apparatus on account of its gravitational force, in particular into at least one disposal apparatus selected from the group consisting of a disposal shaft and a disposal container; a comminution device.

Embodiment 15. The handling module according to the preceding embodiment, wherein the handling module comprises the disposal apparatus.

Embodiment 16. The handling module according to one of the preceding embodiments, wherein the charging ramp, at least partially, is in the form of a slide.

Embodiment 17. The handling module according to the preceding embodiment, wherein the charging ramp has an inclination α with respect to a horizontal plane, wherein $5°≤α≤70°$, in particular $10°≤α≤45°$, preferably $15°≤α≤35°$, particularly preferably $α=25°$.

Embodiment 18. The handling module according to one of the preceding embodiments, wherein the charging ramp is configured with an elastic impact surface.

Embodiment 19. The handling module according to one of the preceding embodiments, wherein the feeding ramp, at least partially, is in the form of a slide.

Embodiment 20. The handling module according to one of the preceding embodiments, wherein the feeding ramp is in the form of an elastic slide.

Embodiment 21. The handling module according to one of the two preceding embodiments, wherein the charging ramp has an inclination β with respect to a horizontal plane, wherein $5°≤β≤70°$, in particular $10°≤β≤45°$, preferably $15°≤β≤35°$, particularly preferably $β=25°$.

Embodiment 22. The handling module according to one of the preceding embodiments, wherein the turning wheel, at least partially, engages in the feeding ramp.

Embodiment 23. The handling module according to the preceding embodiment, wherein conveying fingers of the turning wheel engage in the feeding ramp, in particular in slots in the feeding ramp.

Embodiment 24. The handling module according to one of the two preceding embodiments, wherein carrying-along means of the turning wheel engage in the feeding ramp, in particular in slots in the feeding ramp.

Embodiment 25. The handling module according to one of the preceding embodiments, wherein the turning wheel, at least partially, engages in the charging ramp.

Embodiment 26. The handling module according to the preceding embodiment, wherein conveying fingers of the turning wheel engage in the charging ramp, in particular in slots in the charging ramp.

Embodiment 27. The handling module according to one of the two preceding embodiments, wherein carrying-along means of the turning wheel engage in the charging ramp, in particular in slots in the charging ramp.

Embodiment 28. The handling module according to one of the preceding embodiments, wherein the handling module also has at least one tableware-item brake transversely in front of and/or on the feeding ramp, wherein the tableware-item brake is designed to temporarily brake the tableware item on the feeding ramp.

Embodiment 29. The handling module according to the preceding embodiment, wherein the tableware-item brake comprises at least one strip, for example a strip-like brake, in particular a strip-like brake arranged on and/or in front of the feeding ramp.

Embodiment 30. The handling module according to one of the two preceding embodiments, wherein the tableware-item brake comprises at least two stoppers, wherein each of the stoppers is in the form of a finger.

Embodiment 31. The handling module according to the preceding embodiment, wherein the stoppers are arranged at the side of the turning wheel and can move parallel to a movement direction of the tableware item.

Embodiment 32. The handling module according to one of the two preceding embodiments, wherein the at least two stoppers move in parallel.

Embodiment 33. The handling module according to one of the three preceding embodiments, wherein each one of the at least two stoppers is assigned a dedicated conveying device running around the periphery, for example a chain.

Embodiment 34. The handling module according to one of the four preceding embodiments, wherein at least two respective stoppers, in particular at least one pair of stoppers, are secured to a common carrier strip.

Embodiment 35. The handling module according to the preceding embodiment, wherein the common carrier strip is driven by at least one chain, for example a common chain.

Embodiment 36. The handling module according to one of the six preceding embodiments, wherein the stoppers of the tableware-item brake are arranged at the side of the feeding ramp.

Embodiment 37. The handling module according to the preceding embodiment, wherein the stoppers of the tableware-item brake are arranged at the side of the feeding ramp in order to temporarily brake the tableware item by means of frictional forces.

Embodiment 38. The handling module according to one of the ten preceding embodiments, wherein the tableware-item brake is synchronized with the turning wheel.

Embodiment 39. The handling module according to one of the preceding embodiments, wherein the handling module also has at least one tableware-item brake on the charging ramp, wherein the tableware-item brake is designed to temporarily brake the tableware item on the charging ramp.

Embodiment 40. The handling module according to one of the preceding embodiments, wherein the charging ramp has at least one driven part, wherein the driven part is selected from the group consisting of a belt, in particular a conveyor belt, transport rollers, a link chain.

Embodiment 41. The handling module according to one of the preceding embodiments, wherein at least one movement sequence within the handling module can be synchronized with the conveying apparatus of the conveyor dishwasher.

Embodiment 42. The handling module according to the preceding embodiment, wherein the handling module comprises at least one coupling, wherein the coupling is designed for synchronizing the at least one movement sequence within the handling module with the conveying apparatus of the conveyor dishwasher, wherein the coupling is selected from the group consisting of a mechanical coupling, in particular a direct mechanical coupling, an electronic coupling, for example an electronic coupling of drive motors using at least one sensor.

Embodiment 43. The handling module according to the preceding embodiment, wherein the coupling has at least one sensor, wherein the sensor is an electronic sensor, in particular a light scanner, and/or a mechanical sensor.

Embodiment 44. The handling module according to one of the three preceding embodiments, wherein the handling module comprises at least one transmission for generating and/or controlling the at least one movement sequence within the handling module.

Embodiment 45. The handling module according to one of the preceding embodiments, wherein the handling module has a drive, in particular a drive of the turning wheel, wherein the drive is designed to drive the at least one movement sequence within the handling module.

Embodiment 46. The handling module according to the preceding embodiment, wherein a movement of the drive is monitored by means of a rotary encoder.

Embodiment 47. The handling module according to one of the two preceding embodiments, wherein the drive has an overload protection means, for example an overload protection means using current monitoring and/or maximum current delimitation.

Embodiment 48. The handling module according to the preceding embodiment, wherein the overload protection means is selected from the group consisting of: an overload protection means using current monitoring, an overload protection means using maximum current delimitation, an overload protection means ensuring that a predefined maximum power cannot be exceeded.

Embodiment 49. The handling module according to one of the four preceding embodiments, wherein the drive is configured to be easily releasable, in particular non-self-locking, in the event of possible jamming and/or congestion.

Embodiment 50. The handling module according to one of the five preceding embodiments, wherein the drive is designed to allow automated release, for example by reversing a direction of rotation in an automated manner.

Embodiment 51. The handling module according to one of the preceding embodiments, wherein the handling module also has at least one wiping device for wiping clean the tableware item.

Embodiment 52. The handling module according to the preceding embodiment, wherein the wiping device has at least one driven shaft, wherein the wiping device also comprises at least one at least partially flexible wiping element secured to the shaft, wherein the wiping element is designed to make contact with the tableware item.

Embodiment 53. The handling module according to the preceding embodiment, wherein the wiping device comprises at least three wiping elements.

Embodiment 54. The handling module according to one of the two preceding embodiments, wherein the shaft has at least one axis of rotation, wherein the axis of rotation is arranged substantially orthogonally with respect to a movement direction of the tableware item, for example a transport direction of the tableware item.

Embodiment 55. The handling module according to one of the three preceding embodiments, wherein the shaft is driven in such a way that a movement of the at least one wiping element is synchronized with the movement of the tableware item.

Embodiment 56. The handling module according to one of the four preceding embodiments, wherein the shaft is driven in such a way that the at least one wiping element performs a movement in the direction of movement of the tableware item or counter to the direction of movement of the tableware item.

Embodiment 57. The handling module according to one of the six preceding embodiments, wherein the at least one wiping device for wiping the tableware item is arranged in such a way that only turned tableware items are wiped clean.

Embodiment 58. The handling module according to one of the six preceding embodiments, wherein the at least one wiping device is arranged under the charging ramp.

Embodiment 59. A cleaning system for cleaning washware, comprising:
a. at least one handling module according to one of the preceding embodiments;
b. at least one conveyor dishwasher, wherein the conveyor dishwasher has at least one cleaning chamber and at least one conveying apparatus for conveying washware from an inlet of the cleaning chamber to an outlet of the cleaning chamber through the cleaning chamber, wherein the conveyor dishwasher is designed to apply at least one cleaning fluid to the washware in the cleaning chamber; and
c. at least one conveying system for supplying contaminated washware,
wherein the handling module is designed to transfer tableware items supplied by the conveying system to the conveying apparatus of the conveyor dishwasher.

Embodiment 60. The cleaning system according to the preceding embodiment, wherein the conveying apparatus of the conveyor dishwasher has a plurality of conveying compartments, wherein the charging ramp of a handling module is designed to transfer the tableware item into at least one of the conveying compartments.

Embodiment 61. The cleaning system according to the preceding embodiment, wherein the conveying compartments of the conveyor dishwasher at least partially engage in the charging ramp.

Embodiment 62. The cleaning system according to the preceding embodiment, wherein the conveying compartments, at least partially, are formed by conveying fingers, wherein the charging ramp has openings, in particular slots, for the engagement of the conveying fingers.

Embodiment 63. The cleaning system according to one of the preceding embodiments relating to a cleaning system, wherein the turning wheel is arranged under the conveying system of the conveyor dishwasher.

Embodiment 64. The cleaning system according to one of the preceding embodiments relating to a cleaning system, wherein the turning wheel is arranged above the conveying system of the conveyor dishwasher.

Embodiment 65. The cleaning system according to one of the preceding embodiments relating to a cleaning system, wherein the conveying system comprises at least one apparatus selected from the group consisting of: a conveyor belt; transport rollers, in particular driven transport rollers; a link chain.

Embodiment 66. The cleaning system according to one of the preceding embodiments relating to a cleaning system, wherein the conveying device is selected from the group consisting of: a conveyor belt; transport rollers, in particular driven transport rollers; a link chain.

Embodiment 67. The cleaning system according to one of the preceding embodiments relating to a cleaning system, wherein the conveying apparatus of the conveyor dishwasher has a plurality of conveying fingers, wherein the charging ramp is designed to transfer the tableware item from the turning wheel to the conveying fingers.

Embodiment 68. The cleaning system according to the preceding embodiment, wherein the transfer is effected at a deflection roller of the conveying apparatus, with the result that the tableware item is received by the conveying fingers with the use side facing downward and is placed upright, at least partially, by the conveying apparatus.

Embodiment 69. The cleaning system according to one of the preceding embodiments relating to a cleaning system, wherein a conveying direction of the conveying system for supplying the contaminated washware runs transversely with respect to a conveying direction of the feeding ramp.

Embodiment 70. The cleaning system according to the preceding embodiment, wherein the cleaning system also has a feeding unit for feeding a tableware item from the conveying system to the feeding ramp, in particular at least one slide feeder.

Embodiment 71. The cleaning system according to one of the preceding embodiments relating to a cleaning system, wherein the cleaning system is designed to change a spatial orientation of the use side at least twice.

Embodiment 72. A method for cleaning washware, comprising:
  i. providing at least one cleaning system according to one of the preceding embodiments relating to a cleaning system;
  ii. supplying washware by means of the conveying system, wherein the washware is at least one tableware item;
  iii. feeding the tableware item to the turning wheel of the handling module by means of the feeding ramp;
  iv. receiving the tableware item fed via the feeding ramp in the tableware-item compartment of the turning wheel in an orientation with the use side facing upward;
  v. turning the tableware item by means of the turning wheel;
  vi. placing the tableware item onto the charging ramp with the use side facing downward by means of the turning wheel, wherein, when placed on the use side, waste that is present on the tableware item is disposed of through the disposal opening of the charging ramp on account of its gravitational force; and
  vii. transferring the tableware item from the turning wheel to the conveying apparatus of the conveyor dishwasher by means of the charging ramp.

Embodiment 73. The method according to the preceding embodiment, wherein, in step iii., the tableware item is fed to the turning wheel of the handling module under the action of gravity.

Embodiment 74. The method according to one of the two preceding embodiments, wherein, in step vi., the tableware item is caused to impact the charging ramp with the use side facing downward, with the result that the waste is subject to a force in the direction of the disposal opening in addition to its own gravitational force and is discharged from the tableware part by a hammer-like action.

BRIEF DESCRIPTION OF THE FIGURES

Further details and features will become apparent from the following description of exemplary embodiments, in particular in conjunction with the dependent claims. In this case, the respective features may be implemented on their own or several may be implemented together in combination. The invention is not restricted to the exemplary embodiments. The exemplary embodiments are represented schematically in the figures. In this case, the same reference signs in the individual figures denote elements that are the same or have the same function or elements that correspond to one another in terms of their functions.

In detail.

DESCRIPTION OF THE EXEMPLARY EMBODIMENTS

Figure 1:
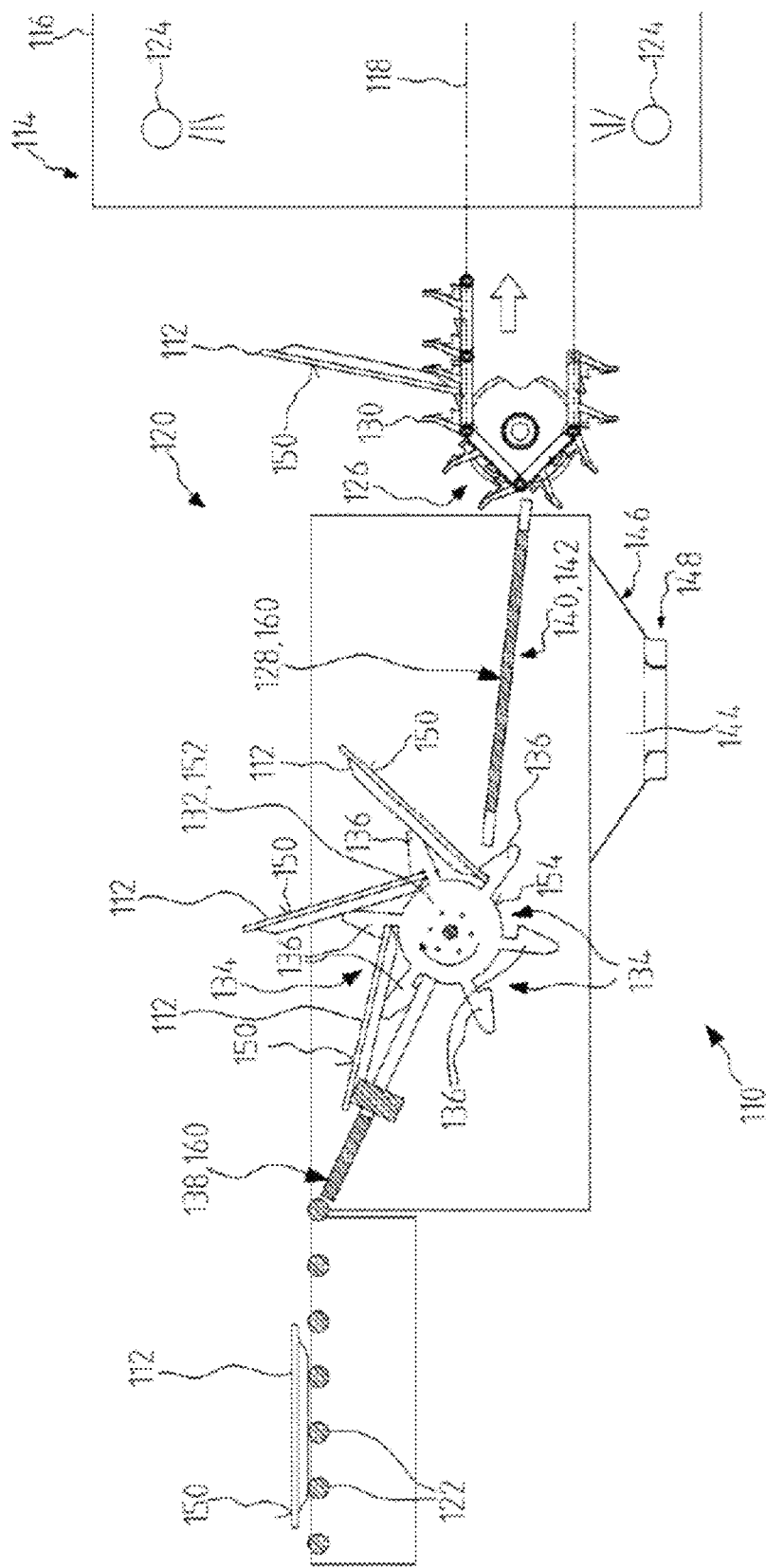
FIG. 1 shows a sectional representation, from the side, of an exemplary embodiment of a cleaning system and a handling module.

FIG. 1 shows a schematic sectional representation of an exemplary embodiment of a cleaning system 110 for cleaning washware, in particular for cleaning tableware items 112. By way of example, the cleaning system 110 of this exemplary embodiment comprises a conveyor dishwasher 114 with a cleaning chamber 116 and a conveying apparatus 118 for conveying the washware 112 through the cleaning chamber 116. In this respect, the arrow depicted in FIG. 1 can indicate, in particular, a movement direction of the conveying apparatus 118. Furthermore, the cleaning system 110 of the exemplary embodiment depicted comprises a handling module 120 for loading the conveying apparatus 118 of the conveyor dishwasher 114 with washware, in particular with tableware items 112. Furthermore, the cleaning system 110 comprises a conveying system 122 for supplying contaminated washware, in particular contaminated tableware items 112.

The conveyor dishwasher 114 comprises an application apparatus 124 that is depicted schematically in FIG. 1. The application apparatus 124 can be used to apply at least one cleaning fluid to the washware 112 which is transported through the cleaning chamber 116, for example a cleaning zone, by means of the conveying device 118. By way of example, multiple cleaning zones, for example at least one pre-clearing zone, at least one washing zone and at least one final rinsing zone and optionally, furthermore, at least one drying zone, may be arranged within the cleaning chamber 116 of the conveyor dishwasher 114, a successive application of cleaning fluid being able to be implemented by way of said cleaning zones. In principle, reference can be made to the aforementioned prior art in respect of possible configurations of the conveyor dishwasher 114. By way of example, the washware 112 can be conveyed from an inlet of the conveyor dishwasher 114 to an outlet through the cleaning chamber 116.

The handling module 120 is designed to transfer tableware items 112 supplied by the conveying system 122 to the conveying apparatus 118 of the conveyor dishwasher 114. As illustrated in FIG. 1, the conveying apparatus 118 of the conveyor dishwasher 114 may have a plurality of conveying compartments 126, for example formed by a plurality of conveying fingers 130. In this respect, in particular, a charging ramp 128 of the handling module 120 may be designed to transfer the tableware item 112 into at least one of the conveying compartments 126. For the sake of better clarity, in FIG. 1 only one conveying finger 130 and one conveying compartment 126 are indicated by reference signs.

The handling module 120 for loading the conveying apparatus 118 of the conveyor dishwasher 114 comprises at least one turning wheel 132 for turning the at least one tableware part 112. In this respect, the turning wheel has at least one tableware-item compartment 134. In particular, the tableware-item compartment 134 may be formed from a plurality of conveying fingers 136 extending radially from the turning wheel 132. For reasons of clarity, in the figures not all conveying fingers 136 and tableware-item compartments 134 are indicated by reference signs.

Furthermore, the handling module 120 comprises at least one feeding ramp 138 for feeding the at least one tableware item 112 to the turning wheel 132, for example under the action of gravity. As already set out above, the handling module also comprises at least one charging ramp 128. In this respect, the charging ramp 128 is designed to transfer the tableware item 112 from the turning wheel 132 to the conveying apparatus 118 of the conveyor dishwasher 114. The charging ramp comprises at least one disposal opening 140. The handling module 120 may in particular also have at least one disposal opening 142, it being possible for the disposal opening 142 of the handling module 120 to correspond to the disposal opening 140 of the charging ramp 128, as depicted by way of example in FIG. 1. In particular, waste can be disposed of into at least one disposal apparatus 144, for example for the purpose of waste treatment, via the disposal opening 142 owing to its gravitational force. In this context, the disposal apparatus 144 may in particular also be included in the handling module. By way of example, the disposal apparatus may have a disposal shaft 146 and a disposal container 148. An additionally or alternatively present comminuting unit (not depicted) is also conceivable.

The turning wheel 132 is arranged between the feeding ramp 138 and the charging ramp 128 and is designed in this respect to receive the tableware item 112 fed via the feeding ramp 138 in the tableware-item compartment 134 in an orientation with a use side 150 facing upward. The turning wheel 132 is also designed to turn the tableware item 112 and to place it onto the charging ramp 128 with the use side 150 facing downward, wherein waste that is present on the use side 150 of the tableware item 112 can be disposed of through the disposal opening 140, 142 on account of its gravitational force when the tableware item is placed onto the charging ramp. In particular, the turning wheel 132 may also cause the tableware item 112 to impact the charging ramp 128 with the use side 150 facing downward, for example to exert a force on the waste in addition to the gravitational force. In this way, for example, waste can be detached from the use side 150 of the tableware item 112 that would not become detached from the use side 150 by gravitational force alone.

Figure 2:
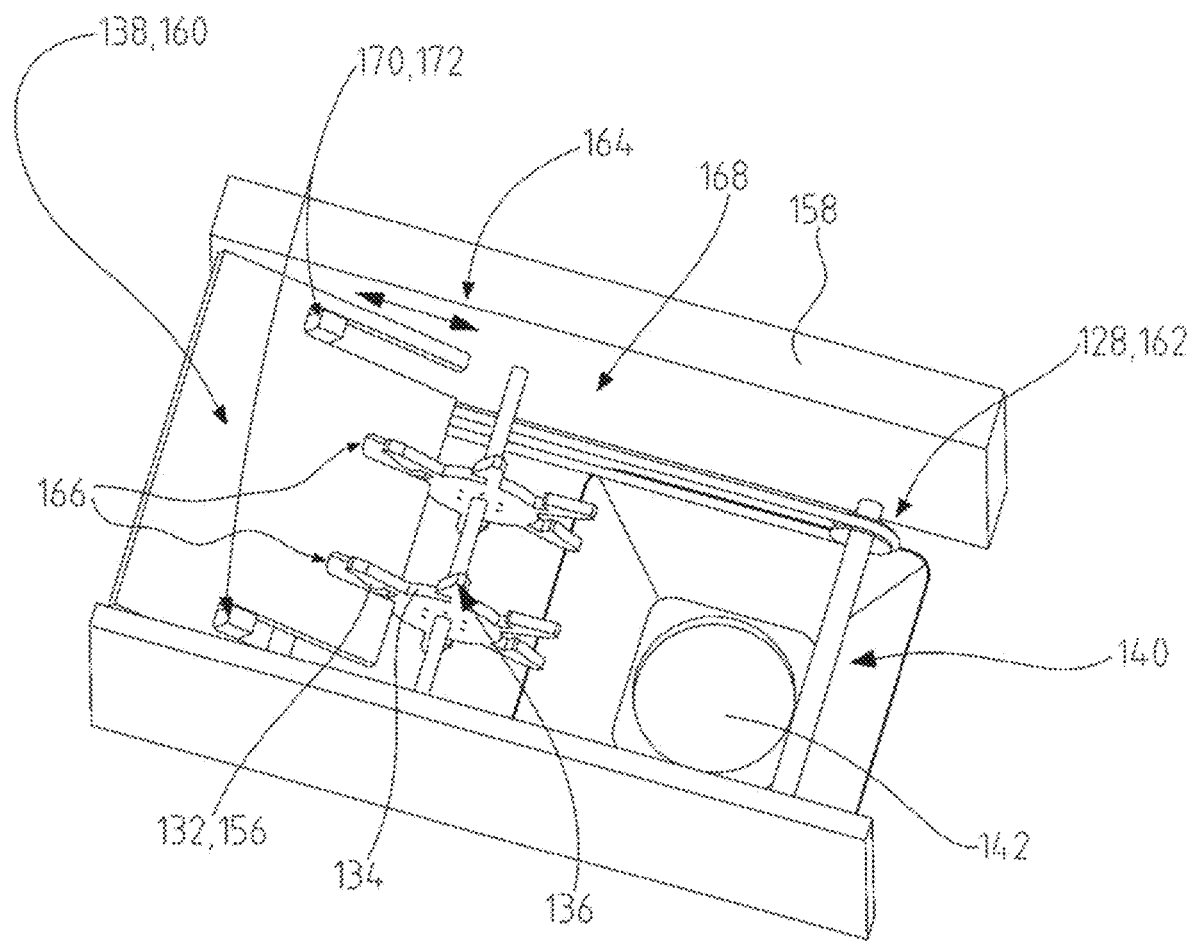
FIG. 2 shows a perspective view of an exemplary embodiment of a handling module.

The turning wheel 132 may comprise, for example, a rotatable drum 152 with a circumferential surface 154, wherein the conveying fingers 136 extend radially from the circumferential surface 154. This embodiment is illustrated in FIG. 1 by way of example. As shown in FIG. 2, for example, the turning wheel 132 may comprise, in particular, at least two disks 156 from which the conveying fingers 136 may radially extend.

Furthermore, the turning wheel 132 may comprise at least one drive 158. In this respect, the drive 158 may be designed to drive, preferably continuously drive, the turning wheel 132.

As depicted in FIG. 1, the charging ramp 128, at least partially, may be in the form of a slide 160, for example an elastic slide 160. The feeding ramp 138, at least partially, may also be in the form of a slide 160, for example an elastic slide 160. The charging ramp 128 may also be in the form of an active element, for example. It is thus possible for the charging ramp 128, as depicted in FIG. 2, for example, to comprise two driven belts 162. Here, the belts 162 may be designed, in particular, to convey the tableware item 112. Furthermore, the charging ramp 128, in whole or in part, may also have an elastic form, for example to cushion the tableware item 112, in particular when it is placed on the charging ramp 128 and/or in the event of the tableware item 112 possibly impacting the charging ramp 128. By way of example, an elastic configuration of the charging ramp 128 may also dampen and/or alleviate noise generation. It is also possible for the feeding ramp 138, in whole or in part, to have an elastic form.

The turning wheel 132 may engage in particular at least partially in the feeding ramp 138. In particular, it is possible, for example, for the turning wheel 132 to engage at least partially, in particular within a first overlap region 164, in the feeding ramp 138, in order to already take up guidance of the tableware item 112 in the first overlap region 164. By way of example, it is possible in particular for the conveying fingers 136 of the turning wheel 132 to engage in the feeding ramp 138. It is thus possible for the conveying fingers 136 of the turning wheel 132 to engage preferably in slots 166 in the feeding ramp 138, for example in extra slots 166 in the feeding ramp 138 provided for engagement. Further, the turning wheel 132 may engage at least partially in the charging ramp 128, for example. In particular, the turning wheel 132 may engage at least partially in the charging ramp 128 in order to transfer the tableware item 112 to the charging ramp 128 in a second overlap region 168. In particular, the conveying fingers 136 of the turning wheel 132 may engage in the charging ramp 128, for example.

Furthermore, the handling module 120 may have at least one tableware-item brake 170 on the feeding ramp 138, for example. In particular, the tableware-item brake 170 may be designed to at least temporarily brake the tableware item 112 on the feeding ramp 138. In particular, the tableware-item brake 170 may comprise two stoppers 172, for example. The stoppers 172 may be arranged for example in whole or in part in the first overlap region 164 from the feeding ramp 138 to the turning wheel 132. The stoppers 172 may move parallel to a movement direction of the tableware item 112, for example. The movement of the stoppers 172 is indicated in FIG. 2 by way of example by the double-headed arrow.

Figure 3:
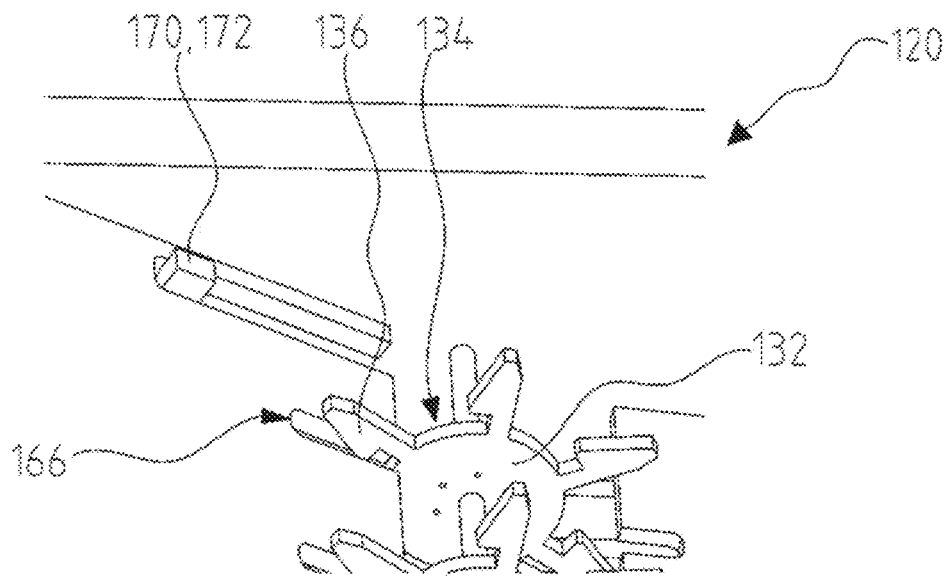
FIGS. 3 and 4 show perspective views of details of exemplary embodiments of a handling module.

The movement of the tableware-item brake 170 may be synchronized, for example, with the rotation of the turning wheel 132. In particular, the tableware-item brake 170 may move synchronously with the rotation of the turning wheel 132. It is thus possible for the stoppers 172 of the tableware-item brake 170 to be in an upper position, shown in FIG. 3, in particular in an upper end position, when the turning wheel 132, in particular the conveying fingers 136 of the turning wheel 132, prevent, in particular do not allow, access to the tableware-item compartment 134. In particular, the stoppers 172 of the tableware-item brake 170 can in this way, for example, retain and/or brake a tableware item 112, in order for example to prevent the tableware item 112 from impacting against the turning wheel 132, in particular against a conveying finger 136 of the turning wheel 132, when the tableware-item compartment 134 is closed toward the feeding ramp 138.

Figure 4:
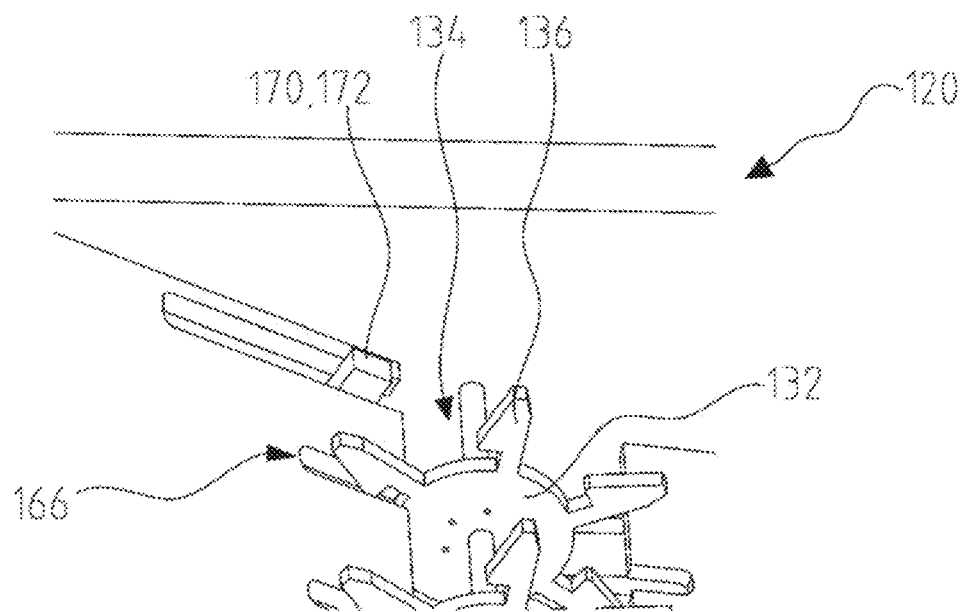
Figure 5:
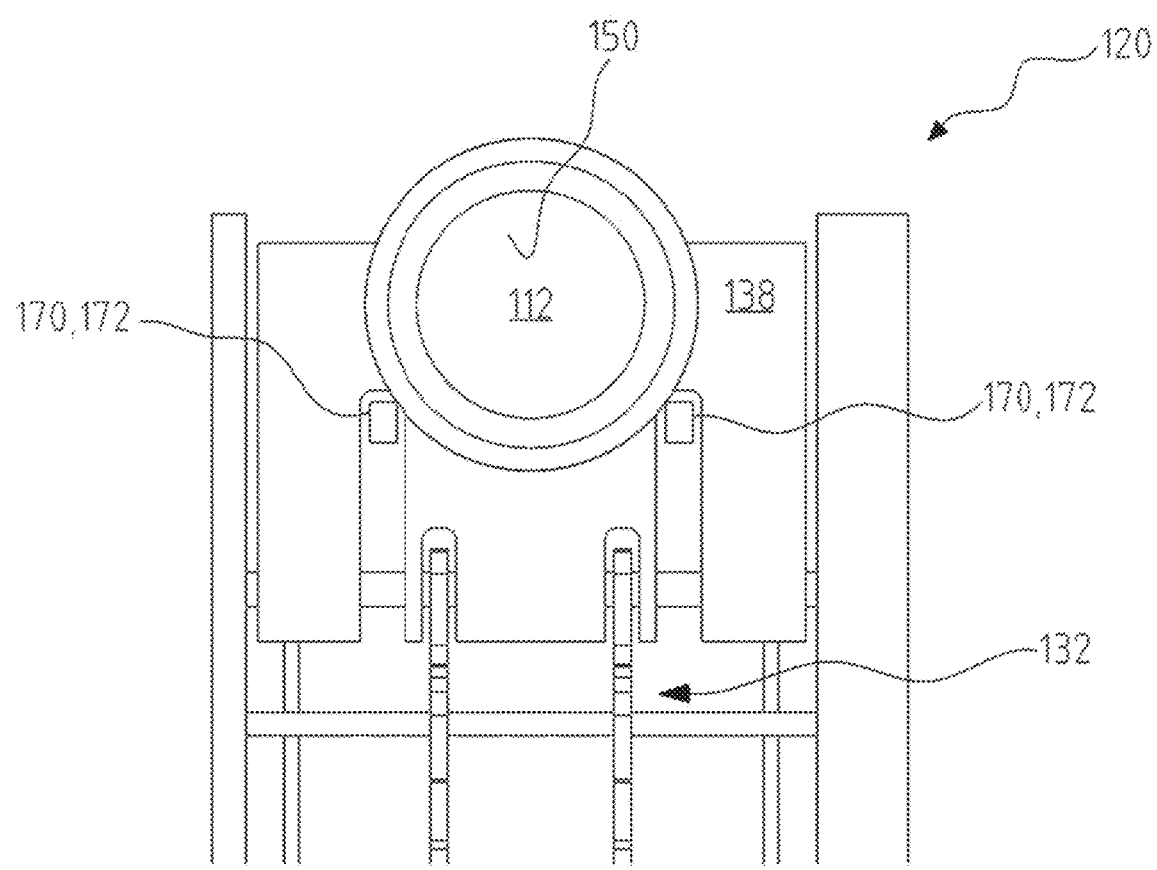
FIGS. 5 to 10 show perspective views of exemplary embodiments of a handling module.
Figure 6:
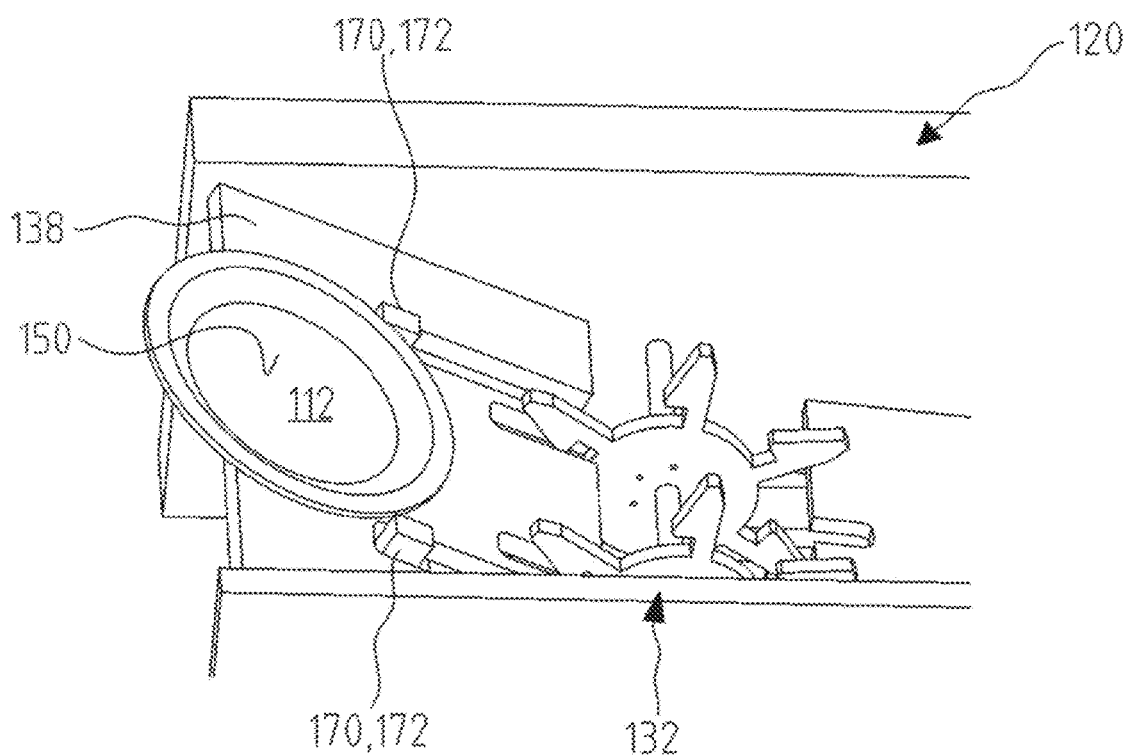
Figure 7:
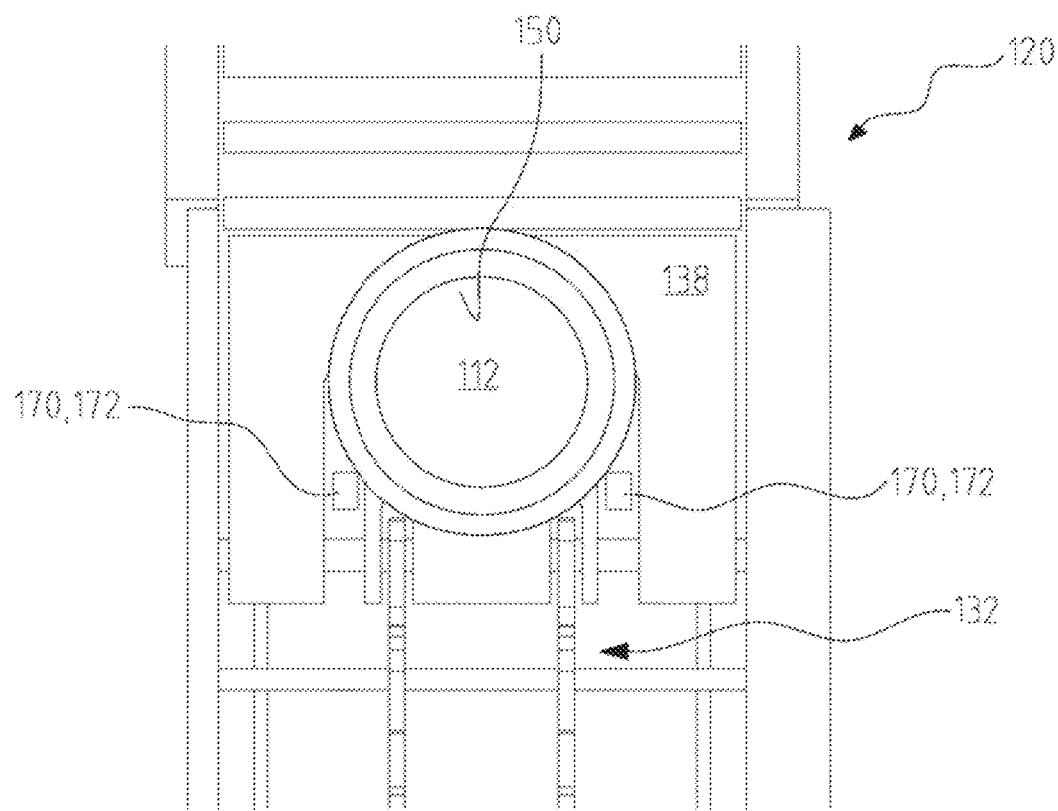

FIG. 4 depicts the stoppers 172 of the tableware-item brake 170 in a lower position. By way of example, the stoppers 172 of the tableware-item brake 170 may be located in the lower position, in particular in a lower end position, when the turning wheel 132, in particular the conveying fingers 136 of the turning wheel 132, are in a position, e.g. a rotational position, in which the tableware-item compartment 134 of the turning wheel 132 is open, in particular positioned, in such a way that the tableware item 112 can be received in the tableware-item compartment 134 of the turning wheel 132.

Figure 11:
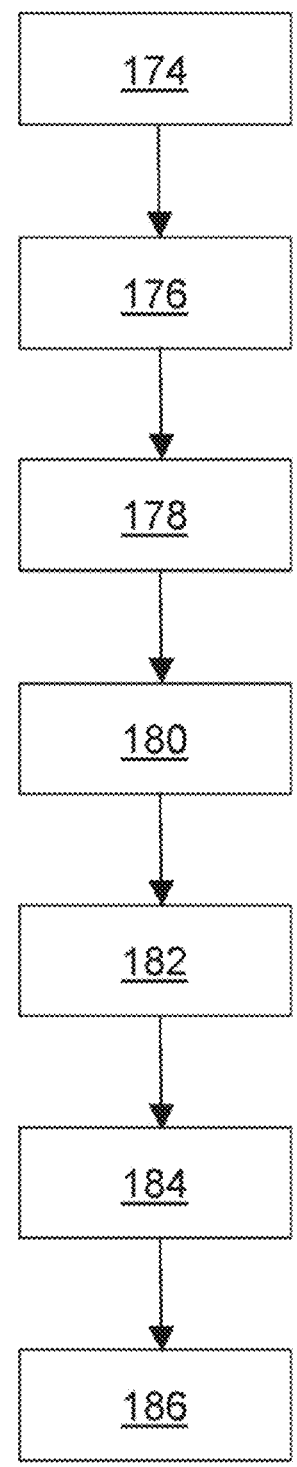
FIG. 11 shows a flow diagram of an exemplary embodiment of a method for cleaning washware.

FIG. 11 shows a flow diagram of an exemplary embodiment of a method for cleaning washware 112. The method comprises the following steps:
  i. (characterized by reference sign 174) providing at least one cleaning system 110, in particular according to one or more of the configurations described above, for example as illustrated in FIG. 1;
  ii. (characterized by reference sign 176) supplying washware 112 by means of the conveying system 122, wherein the washware 112 is at least one tableware item 112;
  iii. (characterized by reference sign 178) feeding the tableware item 112 to a turning wheel 132 of the handling module 120, for example under the action of gravity, by means of the feeding ramp 138;
  iv. (characterized by reference sign 180) receiving the tableware item 112 fed via the feeding ramp 138 in the tableware-item compartment 134 of the turning wheel 132 in an orientation with the use side 150 facing upward;
  v. (characterized by reference sign 182) turning the tableware item 112 by means of the turning wheel 132;
  vi. (characterized by reference sign 184) placing the tableware item 112 onto the charging ramp 128 with the use side 150 facing downward by means of the turning wheel 132, wherein, when placed on the use side, waste that is present on the tableware item 112 is disposed of through the disposal opening 140 of the charging ramp 128 on account of its gravitational force; and
  vii. (characterized by reference sign 186) transferring the tableware item 112 from the turning wheel 132 to the conveying apparatus 118 of the conveyor dishwasher 114 by means of the charging ramp 128.

Figure 8:
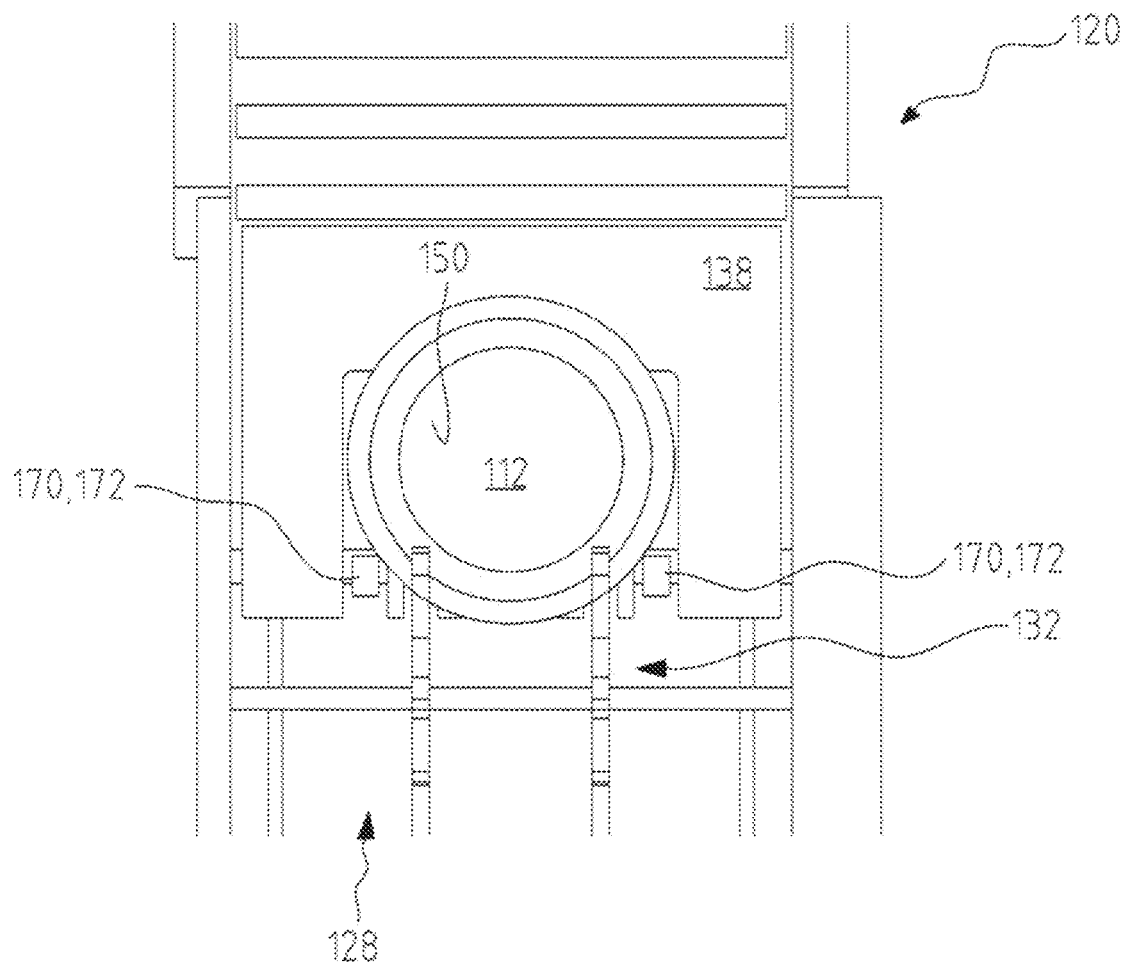
Figure 9:
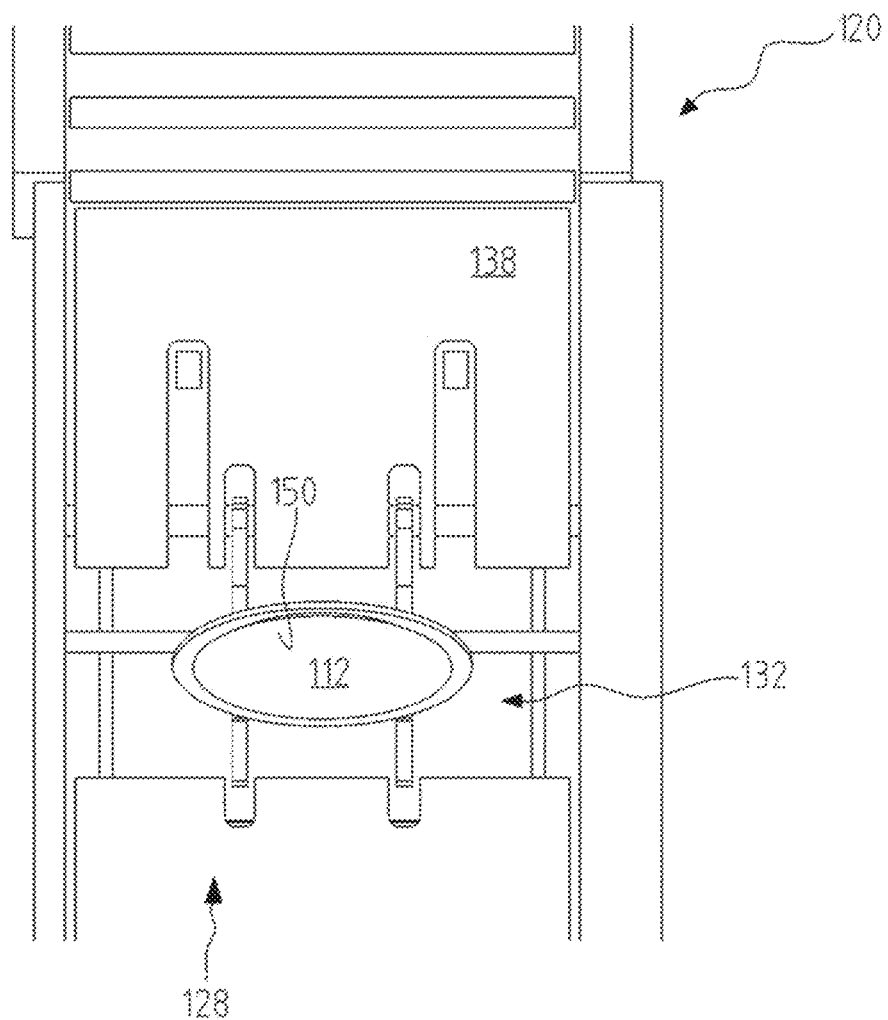
Figure 10:
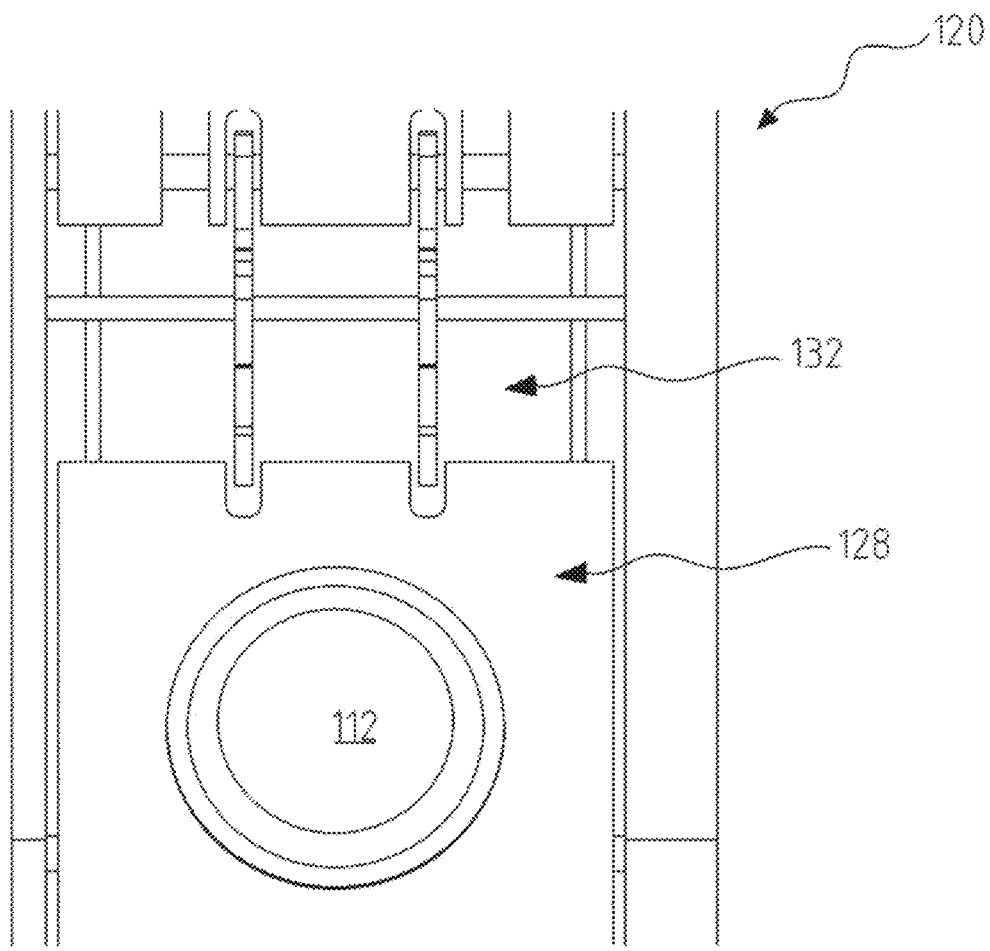

FIGS. 5 to 10 show details of an exemplary embodiment of the handling module 120 when the method is being carried out. In particular, FIGS. 5 to 7, for example, show details of an exemplary embodiment of the handling module 120 when the tableware item 112 is being fed to the turning wheel 132 of the handling module 120 by means of the feeding ramp 138, in particular the performance of step iii. 178. FIG. 8 illustrates a detail of an exemplary embodiment of the handling module 120 when the tableware item 112 fed via the feeding ramp 138 is being received in the tableware-item compartment 134 of the turning wheel 132 in an orientation with the use side 150 facing upward, in particular the performance of step iv. 180. FIG. 9 shows a detail of an exemplary embodiment of the handling module 120 when the tableware item 112 is being turned by means of the turning wheel 132, in particular the performance of step v. 182. FIG. 10 shows a detail of an exemplary embodiment of the handling module 120 when the tableware item 112 is being placed on the charging ramp 128 with the use side 150 facing downward by means of the turning wheel 132, wherein waste that is present on the use side 150 of the tableware item 112 is disposed of through the disposal opening 140 of the charging ramp 128 on account of its gravitational force when the tableware item is placed onto the charging ramp, in particular the performance of step vi. 184.

By way of example, an aim of the present invention can be to save on staff, in particular to save on staff for processing tableware items 112, for example place-setting sets, before said tableware items are fed into a dishwasher, in particular into a conveyor dishwasher 114. Thus, for example, great modularity makes it possible to very individually, but at the same time also variably, set and operate the entire processing region between the dining room and the dishwasher. In particular, it can be conceivable for the assembly to be altered in terms of number, type and arrangement of handling modules over the course of a day. This may be done for example depending on requirements, in particular depending on the multiplicity of different tableware items, e.g. depending on the scope of the place-setting set. A number of different tableware items can vary from meal to meal. In particular, a number of the tableware items for breakfast or dinner may differ from a number of tableware items for lunch.

In particular, in addition to the apparatuses and methods described in the present document, individually known components may be added, in particular continue to be used. It can thus be possible to supplement the apparatuses and methods described in this document with simple slide feeders or wipers. Flatware-lifting magnets may also be present in a selection of supplementing processing tools, for example.

The tableware items 112 may be fed to the handling module 120 in particular in a defined position, e.g. in a normal use position, in particular with the use side 150 facing upward.

The handling module 120 is suitable, in particular, for executing one or more of the following functions:
  turning the tableware item 112;
  emptying or clearing the tableware item, in particular removing food residues from the tableware item 112;
  using a conveyor belt of the dishwasher to provide the tableware item 112 for receiving purposes.

In particular, the handling module 120 may be designed to dispense the tableware item 112 in the correct position, for example with the use side 150 facing upward, and preferably also to dispense it from the handling module at a desired time.

This function of the handling module 120 may be supplemented with an integrated treatment of the food residues, for example. In particular, this can mean that the food residues remaining on the tableware items after use, for example after eating, are collected and/or treated in the handling module and e.g. after an operating time has elapsed, do not have to be manually removed, but rather the handling module automatically discharges the food residues as required and/or continuously. This can be effected, for example, by creating a pumpable mass, in particular in the disposal apparatus 144. An exemplary receptacle for food residues could be an integrated disposal container 148, for example a trash can, e.g. arranged inside the handling module 120. Other solutions, for example connection to a central waste elimination facility, are likewise also conceivable.

In particular, the handling module 120 may be configurable, for example, for different tableware items, in particular for different washware. It is thus possible for the handling module 120, for example the conveying fingers 136 of the turning wheel 132, to be adaptable to a dimension of the tableware items 112, e.g. to plates, cups, dishes, bowls, trays and/or flatware. In this way, it may be possible, for example, for handling modules for different tableware items to be largely the same and only a few individual components have to be adapted to the respective use. This leads to cost saving in the development and the production of the handling modules.

The handling module 120 may be designed, for example, to forward batches of the processed quantities of tableware to a controller of the dishwasher, in particular the conveyor dishwasher 114. It is thus possible, for example, for the respective handling module 120 to send a signal to the dishwasher when no washware is fed in, in the event of use of a plurality of handling modules 120 in a cleaning system 110. This may occur in particular when the tableware items 112, e.g. the place-setting sets, are not fully charged. The dishwasher, in particular the conveyor dishwasher 114, may introduce a strategy for saving resources, for example, using such information.

The handling module 120 may be designed, for example, to be arranged and/or docked on any desired point at the inlet of a dishwasher, in particular a conveyor dishwasher 114. The handling module 120 may be configured and/or designed, for example, in such a way that it can be displaced from one position at the machine inlet to another position without tools, including the supply of power and/or control signals.

In particular, multiple handling modules 120, in particular handling modules that can be upgraded for different tableware items, may be arranged next to one another at the machine inlet. In particular, the handling modules may be configured in such a way that a width, in particular a width required by the tableware item 112 on the conveying apparatus 118, e.g. on the dishwasher belt, is not exceeded or is exceeded only insignificantly. In particular, this makes it possible to maintain a routine capacity of the dishwasher, for example, or preferably not to reduce it.

A number of handling modules may be adaptable in particular to a quantity of tableware items 112 to be cleaned. It is thus possible for the number and arrangement of the handling modules 120 to be determined, for example by a quantity of the items to be rinsed, by the requirements of the dishwasher, e.g. a width, a type and a distribution of the treatment sections, a type of tableware items, in particular a type of washware, a distribution of the quantity of washware, for example across the different forms, or the like.

By way of example, in one embodiment of the conveying system 122, for example a feeding belt, on which the tableware items 112, e.g. the place setting items, can be conveyed from a dining room to a scullery, may be arranged transversely in front of the handling module 120. In particular, the conveying system 122 may run orthogonally with respect to an inlet of the dishwasher, for example. By way of example, a plurality of handling modules 120 may be arranged between the conveying system 122, e.g. the feeding belt, and the inlet of the dishwasher, in particular the conveyor dishwasher 114. By way of example, further processing may also be carried out in the cleaning system 110 in parallel with the handling module 120, for example the flatware could be removed from the conveying system 122 by a magnet. Processing a tray in parallel, for example by means of a simple automation module, is also conceivable.

In particular, in one embodiment, a robot could be arranged parallel to the handling module 120 and/or integrated in the handling module 120. By way of example, the robot could be designed to remove individual or multiple tableware items 112, for example a drinking glass from a tray. In addition, a member of staff can remove the other tableware items 112 by hand. As an alternative or in addition, the other tableware items 112, e.g. flatware and tray, could also be processed in parallel, for example guided to the dishwasher together by means of a simple automation module.

In particular, in the future, in comparison with embodiments known to date, it will be possible for example to alter a tableware item return situation in a dining room in such a way that the tableware items 112, e.g. the constituent items of the place-setting set, can be individually returned, for example by a guest, in particular an individual who has eaten in the dining room, already during the return. By way of example, it can be possible to convey these tableware items 112 returned in this way respectively separately to the handling modules 120 and to process them further there, as described above.

In particular, upgrading already installed installations for cleaning washware 112 is also conceivable by virtue of the proposed apparatuses and methods, for example. It can thus be possible, for example, depending on the development of mass catering or robot technology, to upgrade, retrofit and/or alter installed installations.

Figure 12:
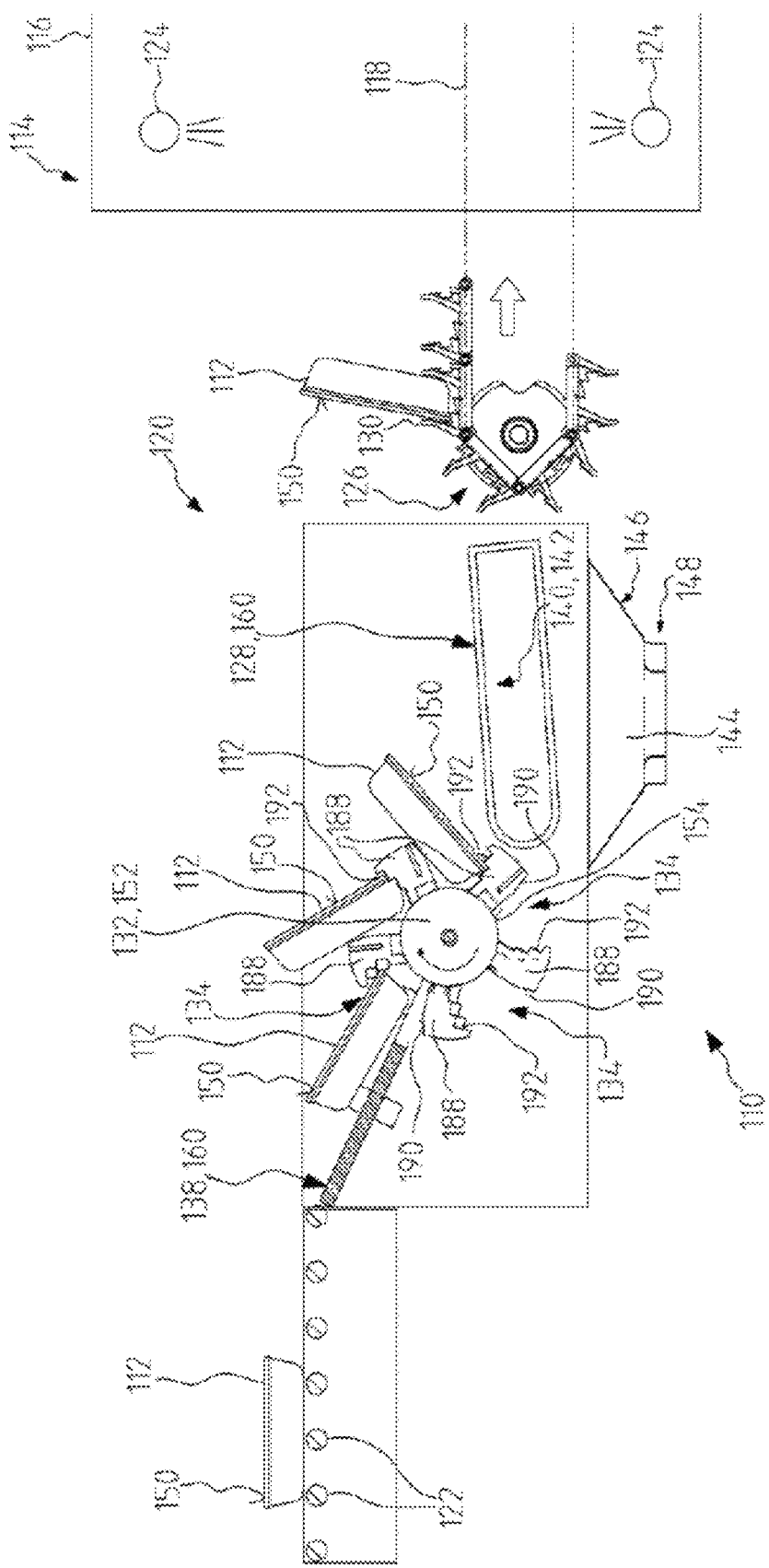
FIG. 12 shows a sectional representation, from the side, of a further exemplary embodiment of a cleaning system and a handling module.

FIG. 12 shows a sectional illustration, from the side, of a further exemplary embodiment of a cleaning system 110 for cleaning washware, in particular for cleaning tableware items 112. The exemplary embodiment shown in FIG. 12 corresponds largely to the exemplary embodiment shown in FIG. 1, differences exhibiting themselves in the configuration of the turning wheels 132. Thus, the turning wheel 132 depicted in FIG. 12, for example, has a plurality of radially extending carrying-along means 188. The carrying-along means 188 may in particular form the at least one tableware-item compartment 134. By way of example, each of the carrying-along means 188 may have a turning geometry 190 and a hold-down geometry 192.

The cleaning system 110 may be designed, for example, in such a way that movement sequences, in particular movement sequences of the handling module 120, are matched to movement sequences of the conveyor dishwasher and/or of the conveying system 122. It may thus be possible, for example, for the cleaning system 110 to be designed in such a way that eighteen tableware items 112 per minute can be conveyed on the conveying system 122, for example corresponding to transporting fifteen trays away from a dining room (not depicted), and can be processed by the cleaning system 110. In this respect, it may be necessary, for example, to adapt the speed of the movement sequences within the cleaning system 110, for example the movement sequences of the handling module 120. It may thus be possible, for example, for the conveyor dishwasher 114, in particular the conveying apparatus 118 of the conveyor dishwasher 114, to have a higher speed than the conveying system 122, for example, in particular to avoid congestion, for example.

Figure 13:
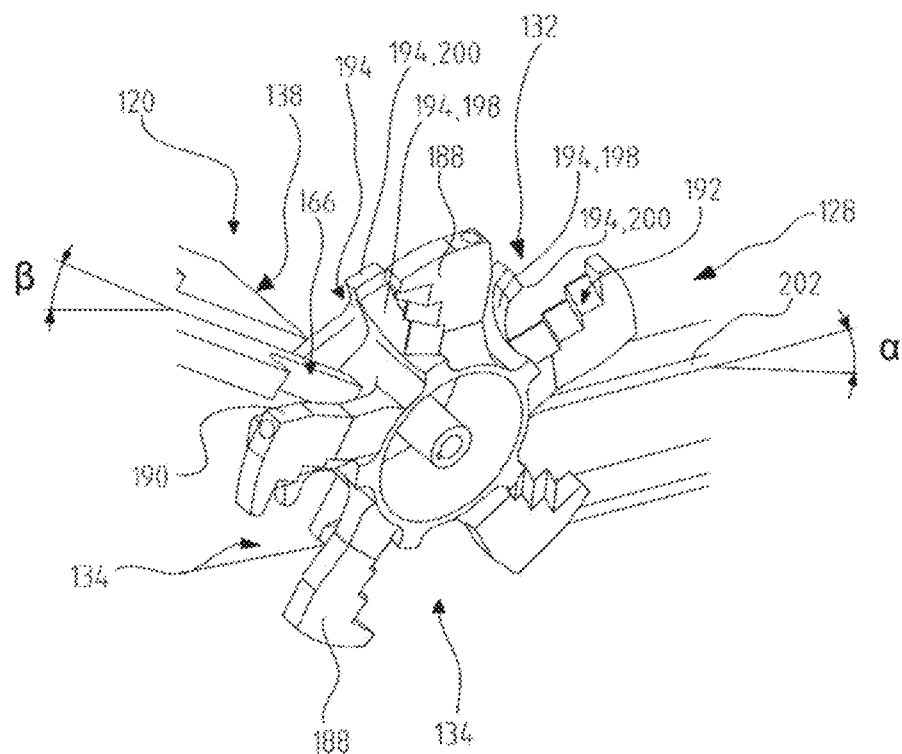
FIGS. 13 to 15 show perspective sectional representations, from the side, of details of exemplary embodiments of a handling module.
Figure 14:
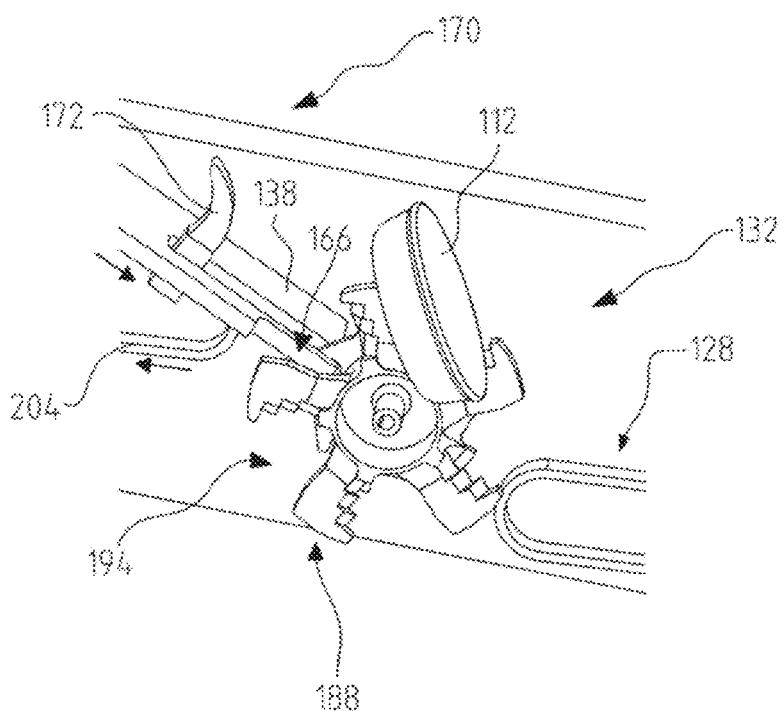
Figure 15:
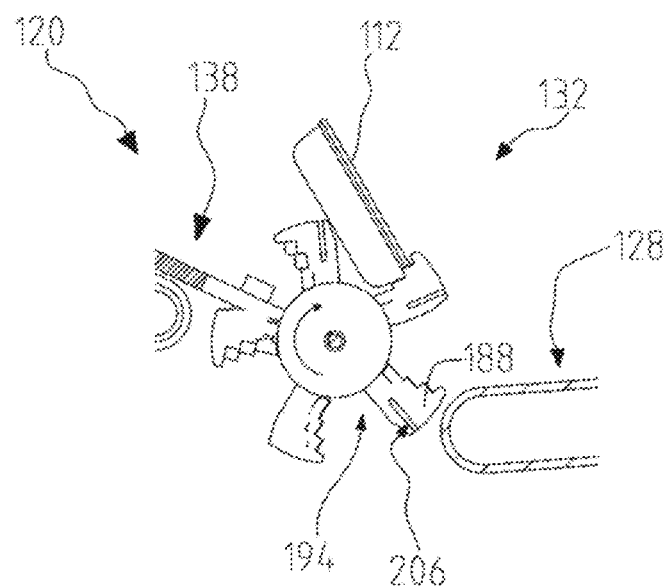

FIGS. 13 to 15 illustrate details, shown in each case in a sectional representation, of exemplary embodiments of a handling module 120. The turning wheel 132 may have a plurality of guide structures 194, for example. In particular, the carrying-along means 188 and the guide structures 194, preferably together, may form the tableware-item compartment 134. By way of example, the number of tableware-item compartments 134 of the turning wheel 132 may vary. In particular, the number of tableware-item compartments 134 may vary depending on the form of the tableware items 112 and/or be adapted to a predefined throughput, for example to a required throughput. Other conditions, such as a height difference between the charging ramp 128 and the feeding ramp 138, may also be of importance. It is thus possible, for example, for the turning wheel 132 to form six tableware-item compartments 134, as can be seen by way of example in FIG. 12. By way of example, the turning wheel 132, as shown by way of example in FIGS. 13-15, may also form five tableware-item compartments 134.

By way of example, each of the guide structures 194 may have at least one guide contour 196, in particular the guide structures may have three guide contours 196, for example. In this respect, the guide contours 196, for example, may comprise one concave guide contour 198 and two guide edges 200, for example. In particular, the turning wheel 132 may have a symmetrical configuration, with the result that, for example, the guide structure 194 can have a concave guide contour 198 extending across the planes of symmetry and two respective guide edges 200, the guide edges 200 being able to be arranged at a respective end of the concave guide contour 198, for example.

In particular, the carrying-along means 188 of the turning wheel 132 may engage in the charging ramp 128. The charging ramp 128 may have an inclination α with respect to a horizontal plane. Furthermore, the charging ramp 128, for example, may be in the form of an active charging ramp 128 and have at least one driven part. This driven part may comprise at least one conveyor belt 202, for example.

In particular, the carrying-along means 188 of the turning wheel 132 may engage in the feeding ramp 138. It is thus possible for the carrying-along means 188 of the turning wheel 132 to engage preferably in slots 166 in the feeding ramp 138, for example in extra slots 166 in the feeding ramp 138 provided for engagement. The feeding ramp 138 may have an inclination β with respect to a horizontal plane.

Furthermore, the handling module 120 may have at least one tableware-item brake 170. The tableware-item brake 170 may be arranged, for example, on the feeding ramp 138 and may comprise two stoppers 172, for example. In this respect, each stopper 172 may be assigned a dedicated conveying device 204 running around the periphery. It is thus possible, for example, for the stoppers 172 to be driven via the conveying device 204 running around the periphery.

In particular, the conveying device 204 running around the periphery can influence the movement of the stopper 172 in such a way that the stopper 172 likewise moves around the periphery. By way of example, the stopper 172 driven by the conveying device 204 running around the periphery, for example, may move around the periphery such that it moves parallel to a movement direction of the tableware item 112 on the top side of the feeding ramp 138 and moves counter to the movement direction of the tableware item 112 on the bottom side of the feeding ramp 138, in particular around the periphery. A movement sequence of this type is illustrated by way of example by arrows in FIG. 13.

The carrying-along means 188 of the turning wheel 132 may in particular be secured reversibly, for example interchangeably. By way of example, such securing of the carrying-along means 188 may be implemented by means of screws. To that end, corresponding bores 206 and/or threads may be provided, in particular on the carrying-along means 188, as shown by way of example in FIG. 15. Other securing types are also possible.

Figure 16:
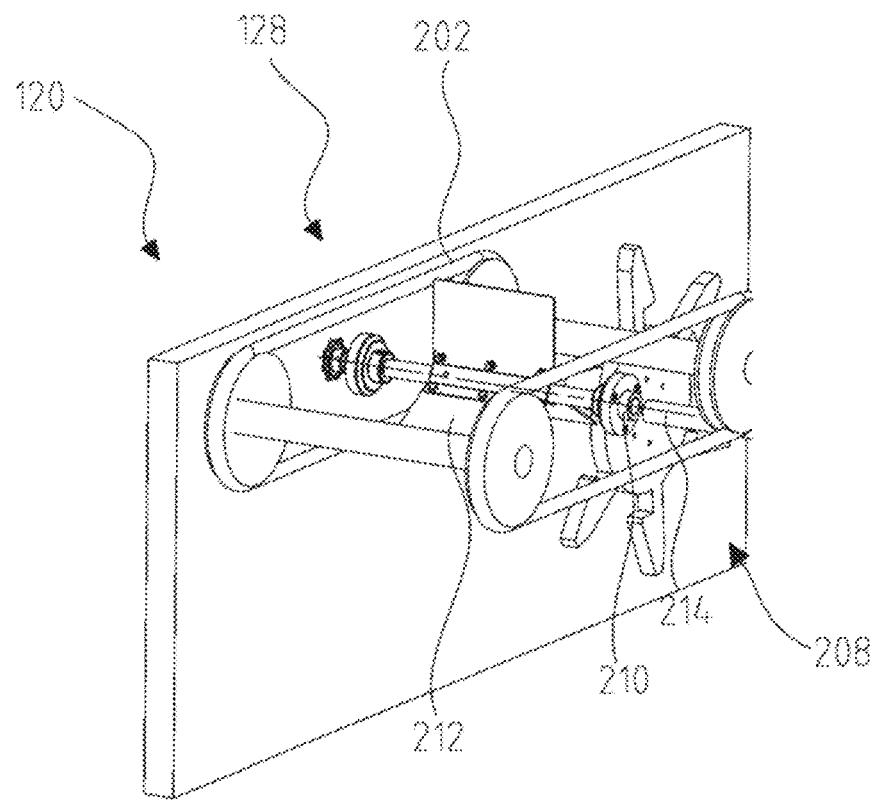
FIGS. 16 and 17 show perspective views of details of exemplary embodiments of a handling module.
Figure 17:
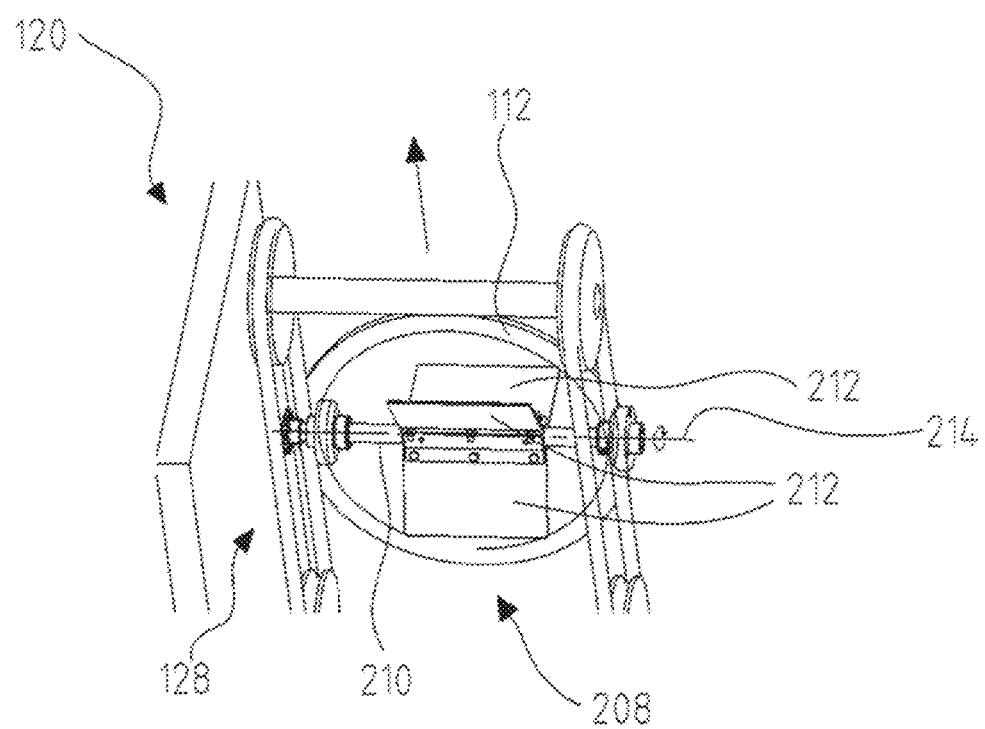

FIGS. 16 and 17 depict perspective views of details of further exemplary embodiments of a handling module 120. The handling module 120 may have at least one wiping device 208 for wiping clean the tableware item 112. In particular, the wiping device 208 may have at least one driven shaft 210, for example. Furthermore, the wiping device 208 may comprise, for example, at least one at least partially flexible wiping element 212 secured to the shaft 210. The wiping element 212 may be designed, in particular, to make contact with the tableware item 112, as illustrated by way of example in FIG. 17.

By way of example, the wiping device 208 may be arranged under the charging ramp 128, for example in a region between an upper running direction and a lower running direction of the conveyor belt 202 running around the periphery. It is thus possible, in particular, for the wiping elements 212 secured to the driven shaft 210 to perform a movement, for example driven by means of the driven shaft 210, which allows waste, such as food residues, to be wiped off and/or scraped off from a surface of the tableware item 112. The movement, in particular a rotational movement, of the wiping elements 212 about an axis of rotation 214 of the driven shaft 210 may be performed, for example, in such a way that the wiping elements 212 wipe the tableware item 112 in a direction oriented in the opposite direction to the direction of movement of the tableware item 112. These movement directions are illustrated by way of example by arrows in FIG. 17. A reversed movement direction of the wiping elements 212, in particular in a rotational movement in the opposite direction, is also possible.

LIST OF REFERENCE SIGNS

110 Cleaning system
112 Tableware item
114 Conveyor dishwasher
116 Cleaning chamber
118 Conveying apparatus
120 Handling module
122 Conveying system
124 Application apparatus
126 Conveying compartment
128 Charging ramp
130 Conveying finger of the conveying apparatus
132 Turning wheel
134 Tableware-item compartment
136 Conveying finger of the turning wheel 138 Feeding ramp
140 Disposal opening
142 Disposal opening
144 Disposal apparatus
146 Disposal shaft
148 Disposal container
150 Use side
152 Drum
154 Circumferential surface
156 Disk
158 Drive
160 Slide
162 Belt
164 First overlap region
166 Slot
168 Second overlap region
170 Tableware-item brake
172 Stopper
174 Step i.
176 Step ii.
178 Step iii.
180 Step iv.
182 Step v.
184 Step vi.
186 Step vii.
188 Carrying-along means
190 Turning geometry
192 Hold-down geometry
194 Guide structures
196 Guide contour
198 Concave guide structure
200 Guide edge
202 Conveyor belt
204 Conveying device
206 Bore
208 Wiping device
210 Shaft
212 Wiping element
214 Axis of rotation

The invention claimed is:

1. A handling module for loading a conveying tool of a dishwasher, comprising:
   A. a turning wheel for turning a tableware item, wherein the turning wheel has a tableware-item compartment;
   B. a feeding ramp for feeding the tableware item to the turning wheel;
   C. a charging ramp for transferring the tableware item from the turning wheel to a conveying tool of the dishwasher, wherein the charging ramp has a disposal opening,
   wherein the turning wheel is arranged between the feeding ramp and the charging ramp, wherein the turning wheel is designed to receive the tableware item fed via the feeding ramp in the tableware-item compartment in an orientation with a use side facing upward, wherein the turning wheel is also designed to turn the tableware item and to place it onto the charging ramp with the use side facing downward, wherein, when placed on the use side, waste that is present on the tableware item can be disposed of through the disposal opening on account of gravitational force,
   wherein the turning wheel is received in an opening in an element selected from the group consisting of the feeding ramp and the charging ramp, and
   wherein the disposal opening is a single opening extending continuously over a length of the charging ramp, wherein that length is sized to receive the turning wheel.

2. The handling module according to claim 1, wherein the turning wheel is designed to cause the tableware item to impact the charging ramp with the use side facing downward.

3. The handling module according to claim 1, wherein the turning wheel has a plurality of radially extending conveying fingers, wherein the conveying fingers form the tableware-item compartment.

4. The handling module according to claim 3, wherein the turning wheel comprises two disks from which the conveying fingers extend radially.

5. The handling module according to claim 1, wherein the turning wheel has a plurality of carrying-along means, wherein the carrying-along means form the tableware-item compartment.

6. The handling module according to claim 5, wherein each of the carrying-along means has one turning geometry and one hold-down geometry.

7. The handling module according to claim 5, wherein the turning wheel has a plurality of guide structures, wherein the guide structures and the carrying-along means form the at least one tableware-item compartment.

8. The handling module according to claim 1, wherein the handling module also has a second disposal opening, wherein the waste can be disposed of via the second disposal opening into a disposal apparatus on account of gravitational force.

9. The handling module according to claim 1, wherein the charging ramp has an elastic form.

10. The handling module according to claim 1, wherein the feeding ramp has an elastic form.

11. The handling module according to claim 1, wherein the handling module also has a tableware-item brake on the feeding ramp, wherein the tableware-item brake is designed to temporarily brake the tableware item on the feeding ramp, wherein the tableware-item brake comprises two stoppers, wherein each of the stoppers is in the form of a finger.

12. The handling module according to claim 1, wherein the handling module also has a tableware-item brake on the charging ramp.

13. The handling module according to claim 12, wherein the handling module comprises a coupling, wherein the coupling is designed for synchronizing a movement sequence within the handling module with the conveying tool of the dishwasher, wherein the coupling is an electronic coupling.

14. The handling module according to claim 1, wherein the handling module also has a wiping device for wiping clean the tableware item, wherein the wiping device has a driven shaft, wherein the wiping device also comprises an at least partially flexible wiping element secured to the driven shaft, wherein the wiping element is designed to make contact with the tableware item.

15. The handling module according to claim 8, wherein the disposal apparatus is selected from the group consisting of a disposal shaft, a disposal container, and a comminution device.

16. The handling module according to claim 13, wherein the electronic coupling is an electronic coupling of drive motors using a sensor.

17. A cleaning system for cleaning washware, comprising:
a. a handling module according to claim 1;
b. a conveyor dishwasher, wherein the conveyor dishwasher comprises a cleaning chamber and a conveying apparatus for conveying washware from an inlet of the cleaning chamber to an outlet of the cleaning chamber through the cleaning chamber, wherein the conveyor dishwasher is designed to apply a cleaning fluid to the washware in the cleaning chamber; and
c. a conveying system for supplying contaminated washware,
wherein the handling module is designed to transfer tableware items supplied by the conveying system to the conveying apparatus of the conveyor dishwasher.

18. The cleaning system according to claim 17, wherein the conveying apparatus of the conveyor dishwasher has a plurality of conveying compartments, wherein the charging ramp of the handling module is designed to transfer a tableware item into one of the conveying compartments, wherein the conveying compartments of the conveyor dishwasher at least partially engage in the charging ramp, wherein the conveying compartments, at least partially, are formed by conveying fingers, wherein the charging ramp has openings for engagement of the conveying fingers.

19. The cleaning system according to claim 17, wherein the conveying apparatus of the conveyor dishwasher has a plurality of conveying fingers, wherein the charging ramp is designed to transfer a tableware item from the turning wheel to the conveying fingers, wherein the transfer is effected at a deflection roller of the conveying apparatus, with the result that the tableware item is received by the conveying fingers with a use side facing downward and is placed upright, at least partially, by the conveying apparatus.

20. The cleaning system according to claim 18, wherein the openings for the engagement of the conveying fingers are slots.

21. A method for cleaning washware, comprising:
i. providing the cleaning system according to claim 17;
ii. supplying washware by means of the conveying system, wherein the washware is a tableware item, wherein the tableware item comprises a first use side;
iii. feeding the tableware item to the turning wheel of the handling module by means of the feeding ramp;
iv. receiving the tableware item fed via the feeding ramp in the tableware-item compartment of the turning wheel in an orientation with the first use side facing upward;
v. turning the tableware item by means of the turning wheel;
vi. placing the tableware item onto the charging ramp with the first use side facing downward by means of the turning wheel, wherein, when placed on the first use side, waste that is present on the tableware item is disposed of through the disposal opening of the charging ramp on account of gravitational force; and
vii. transferring the tableware item from the turning wheel to the conveying apparatus of the conveyor dishwasher by means of the charging ramp.

\* \* \* \* \*